(12) United States Patent
Famighetti et al.

(10) Patent No.: US 12,094,052 B1
(45) Date of Patent: Sep. 17, 2024

(54) RESIDENTIAL ROBOTIC DEVICE-BASED LIVING AREA ESTIMATION

(71) Applicant: CoreLogic Solutions, LLC, Irvine, CA (US)

(72) Inventors: Frankie Famighetti, Pembroke Pines, FL (US); Anand Singh, Tustin, CA (US); Savita Bhayal, San Diego, CA (US)

(73) Assignee: CoreLogic Solutions, LLC, Irvine, CA (US)

( * ) Notice: Subject to any disclaimer, the term of this patent is extended or adjusted under 35 U.S.C. 154(b) by 0 days.

(21) Appl. No.: 18/098,025

(22) Filed: Jan. 17, 2023

Related U.S. Application Data

(60) Provisional application No. 63/300,976, filed on Jan. 19, 2022.

(51) Int. Cl.
| | | |
|---|---|---|
| *G06T 15/08* | (2011.01) | |
| *G06T 7/10* | (2017.01) | |
| *G06T 7/543* | (2017.01) | |
| *G06T 7/62* | (2017.01) | |

(52) U.S. Cl.
CPC ............... *G06T 15/08* (2013.01); *G06T 7/10* (2017.01); *G06T 7/543* (2017.01); *G06T 7/62* (2017.01); *G06T 2207/20081* (2013.01); *G06T 2207/20182* (2013.01)

(58) Field of Classification Search
CPC ............... G06T 11/001; G06T 2200/24; G06T 2207/10024; G06V 10/25; G06V 10/56; G06V 10/758; G06F 18/24323
See application file for complete search history.

(56) References Cited

U.S. PATENT DOCUMENTS

| | | | |
|---|---|---|---|
| 7,805,220 B2 | 9/2010 | Taylor et al. | |
| 11,157,768 B1 * | 10/2021 | Levinson | G06V 10/764 |
| 2016/0271795 A1 * | 9/2016 | Vicenti | G05D 1/0274 |
| 2019/0086933 A1 | 3/2019 | Munich et al. | |
| 2019/0212752 A1 | 7/2019 | Fong et al. | |
| 2021/0089040 A1 * | 3/2021 | Ebrahimi Afrouzi | A47L 9/2873 |
| 2021/0112647 A1 * | 4/2021 | Coleman | H05B 47/16 |

* cited by examiner

*Primary Examiner* — Ming Wu
(74) *Attorney, Agent, or Firm* — Knobbe, Martens, Olson & Bear, LLP

(57) ABSTRACT

An improved living area estimation system is described herein that can control and/or use data obtained by a residential robotic device that operates within a structure to estimate the living area. In particular, a residential robotic device may navigate along a predetermined or dynamically-determined route on one floor of the structure. As the residential robotic device travels along the route, the residential robotic device can use one or more sensors to track the area covered. The living area estimation system can obtain a traversed area map directly or indirectly from the residential robotic device, use image processing techniques to enhance the traversed area map, and estimate a living area of a floor on which the residential robotic device operated using the enhanced traversed area map. The living area estimation system can then use artificial intelligence and the estimated floor living area to estimate the living area of a structure.

20 Claims, 9 Drawing Sheets

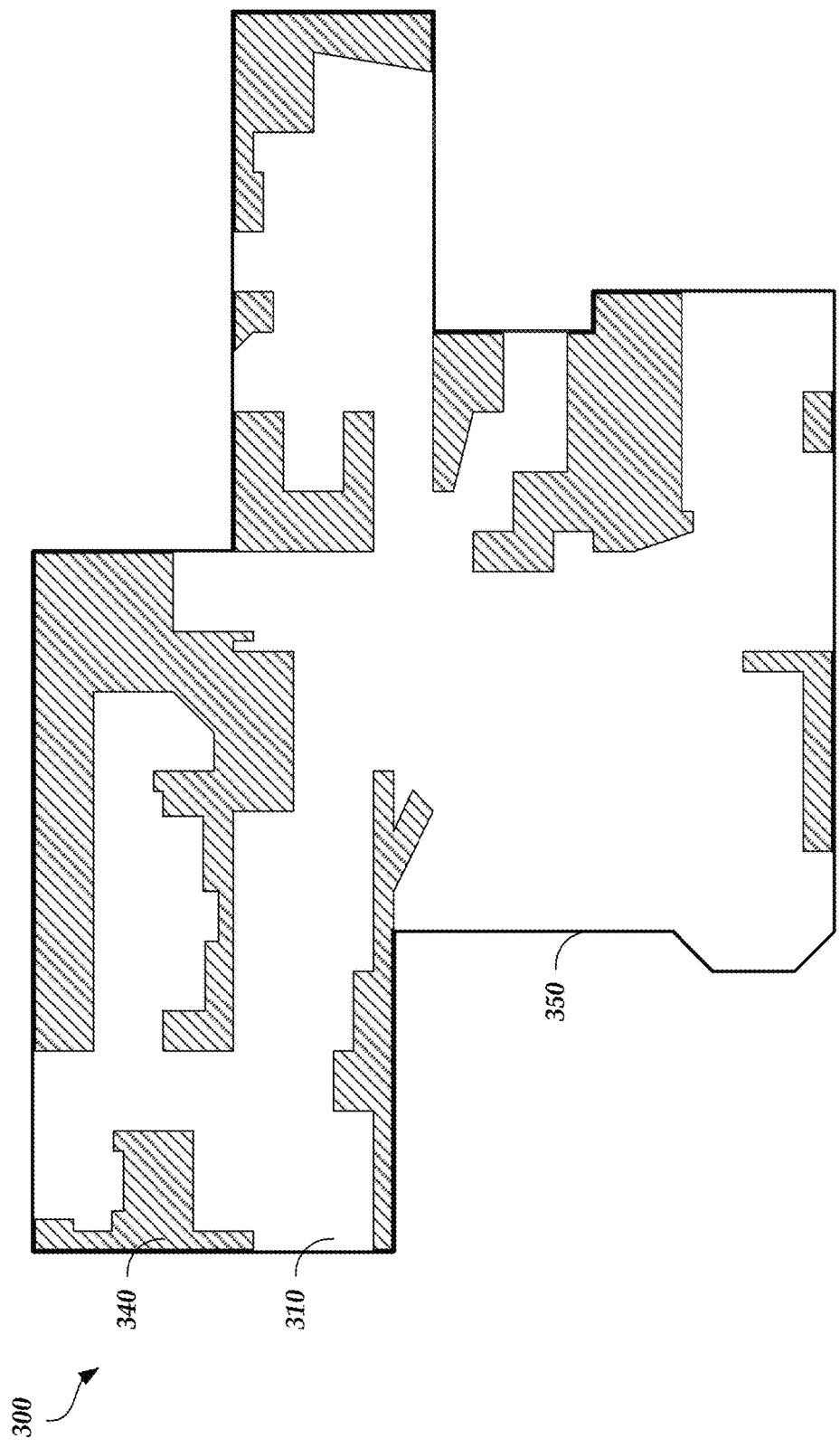

RESIDENTIAL ROBOTIC DEVICE-BASED LIVING AREA ESTIMATION

CROSS-REFERENCE TO RELATED APPLICATIONS

This application claims priority under 35 U.S.C. § 119(e) to U.S. Provisional Patent Application No. 63/300,976, entitled "RESIDENTIAL ROBOTIC DEVICE-BASED LIVING AREA ESTIMATION" and filed on Jan. 19, 2022, the entire disclosure of which is hereby incorporated by reference herein.

TECHNICAL FIELD

The present disclosure generally relates to using a residential robotic device, such as a self-powered vacuum or other Internet-of-things (IoT) device present in a residential property, and artificial intelligence to estimate a living area of a structure.

BACKGROUND

An important feature of structures is the living area. For example, the living area may be an interior habitable area of a dwelling unit and can include one or more bedrooms, one or more bathrooms, one or more closets, a foyer, a family room, a living room, a kitchen, and/or the like. Obtaining an accurate calculation or estimation of the living area can help a potential homeowner understand whether existing furniture will fit within a particular room, the type of heating and/or air conditioning units that may be necessary to heat and/or cool the interior of the property, portions and/or the amount of the property that may be exposed to hazards (e.g., hail events, wind events, floods, storm surge, lightning strikes, tornadoes, hurricanes, other weather phenomena, earthquakes, wildfires, service life of structures, etc.), and/or the like.

SUMMARY

The systems, methods, and devices described herein each have several aspects, no single one of which is solely responsible for its desirable attributes. Without limiting the scope of this disclosure, several non-limiting features will now be discussed briefly.

One aspect of the disclosure provides a system for estimating a living area of a structure. The system comprises memory that stores computer-executable instructions. The system further comprises a processor in communication with the memory, wherein the computer-executable instructions, when executed by the processor, cause the processor to: obtain traversed area data generated in response to a residential robotic device traversing an indoor space of a structure; extract area covered information from the traversed area data; process a traversed area map in the traversed area data using image processing techniques to generate a living area polygon; estimate an initial living area using the extracted area covered information and the living area polygon; obtain property data corresponding to the structure in which the residential robotic device traversed; and apply the property data and the estimated initial living area as an input to a machine learning model to obtain a final living area estimate.

The system of the preceding paragraph can include any sub-combination of the following features: where the computer-executable instructions, when executed, further cause the processor to: extract a value representing an area traversed by the residential robotic device from the traversed area data using object character recognition, determine a number of pixels in the traversed area map that have a first color, and determine a resolution of the traversed area map based on the extracted value and the number of pixels in the traversed area map that have the first color; where the computer-executable instructions, when executed, further cause the processor to: remove noise from the traversed area map to form a first modified traversed area map, fill in holes in the first modified traversed area map to form a second modified traversed area map, fill in at least one of a corner or a side of the second modified traversed area map to form a third modified traversed area map, reduce a size of the third modified traversed area map to form a fourth modified traversed area map, and generate the living area polygon using a polyline that at least partially surrounds the fourth modified traversed area map; where the computer-executable instructions, when executed, further cause the processor to estimate the initial living area using the living area polygon and the determined resolution; where the computer-execution instructions, when executed, further cause the processor to estimate one or more ceiling heights of the indoor space of the structure using distance data obtained from the residential robotic device; where the computer-execution instructions, when executed, further cause the processor to generate a three-dimensional model of the indoor space of the structure using the estimated one or more ceiling heights and the living area polygon; where the computer-execution instructions, when executed, further cause the processor to estimate one or more surface elevations of the indoor space of the structure using altimeter data obtained from the residential robotic device; where the computer-execution instructions, when executed, further cause the processor to estimate an outdoor area of a parcel on which the structure is located using outdoor traversed area data obtained from a second residential robotic device; where the computer-execution instructions, when executed, further cause the processor to estimate a total area of a parcel on which the structure is located using the estimated outdoor area of the parcel and the final living area estimate; where second residential robotic device is a different type of device than the residential robotic device; where the residential robotic device comprises one of a self-powered robotic vacuum, a remote-controlled vehicle, an unmanned aerial vehicle, or a mobile device; and where the residential robotic device comprises an indoor device that moves without human assistance and that includes one or more navigational sensors.

Another aspect of the disclosure provides a computer-implemented method for estimating a living area of a structure. The computer-implemented method comprises: obtaining traversed area data generated in response to a residential robotic device traversing an indoor space of a structure; extracting area covered information from the traversed area data; processing a traversed area map in the traversed area data using image processing techniques to generate a living area polygon; estimating an initial living area using the extracted area covered information and the living area polygon; obtaining property data corresponding to the structure in which the residential robotic device traversed; and applying the property data and the estimated initial living area as an input to a machine learning model to obtain a final living area estimate.

The computer-implemented method of the preceding paragraph can include any sub-combination of the following features: where processing a traversed area map in the traversed area data using image processing techniques to generate a living area polygon further comprises: extracting a value representing an area traversed by the residential robotic device from the traversed area data using object character recognition, determining a number of pixels in the traversed area map that have a first color, and determining a resolution of the traversed area map based on the extracted value and the number of pixels in the traversed area map that have the first color; where processing a traversed area map in the traversed area data using image processing techniques to generate a living area polygon further comprises: removing noise from the traversed area map to form a first modified traversed area map, filling in holes in the first modified traversed area map to form a second modified traversed area map, filling in at least one of a corner or a side of the second modified traversed area map to form a third modified traversed area map, reducing a size of the third modified traversed area map to form a fourth modified traversed area map, and generating the living area polygon using a polyline that at least partially surrounds the fourth modified traversed area map; and where estimating an initial living area using the extracted area covered information and the living area polygon further comprises estimating the initial living area using the living area polygon and the determined resolution.

Another aspect of the disclosure provides a non-transitory, computer-readable medium comprising computer-executable instructions for estimating a living area of a structure, wherein the computer-executable instructions, when executed by a computer system, cause the computer system to: obtain traversed area data generated in response to a residential robotic device traversing an indoor space of a structure; extract area covered information from the traversed area data; process a traversed area map in the traversed area data using image processing techniques to generate a living area polygon; estimate an initial living area using the extracted area covered information and the living area polygon; obtain property data corresponding to the structure in which the residential robotic device traversed; and apply the property data and the estimated initial living area as an input to a machine learning model to obtain a final living area estimate.

The non-transitory, computer-readable medium of the preceding paragraph can include any sub-combination of the following features: where the computer-executable instructions, when executed, further cause the computer system to: extract a value representing an area traversed by the residential robotic device from the traversed area data using object character recognition, determine a number of pixels in the traversed area map that have a first color, and determine a resolution of the traversed area map based on the extracted value and the number of pixels in the traversed area map that have the first color; where the computer-executable instructions, when executed, further cause the computer system to: remove noise from the traversed area map to form a first modified traversed area map, fill in holes in the first modified traversed area map to form a second modified traversed area map, fill in at least one of a corner or a side of the second modified traversed area map to form a third modified traversed area map, reduce a size of the third modified traversed area map to form a fourth modified traversed area map, and generate the living area polygon using a polyline that at least partially surrounds the fourth modified traversed area map; and where the computer-executable instructions, when executed, further cause the computer system to estimate the initial living area using the living area polygon and the determined resolution.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIGS. 3A-3E illustrate example modifications to traversed area map.

DETAILED DESCRIPTION OF SPECIFIC EMBODIMENTS

Figure 1:
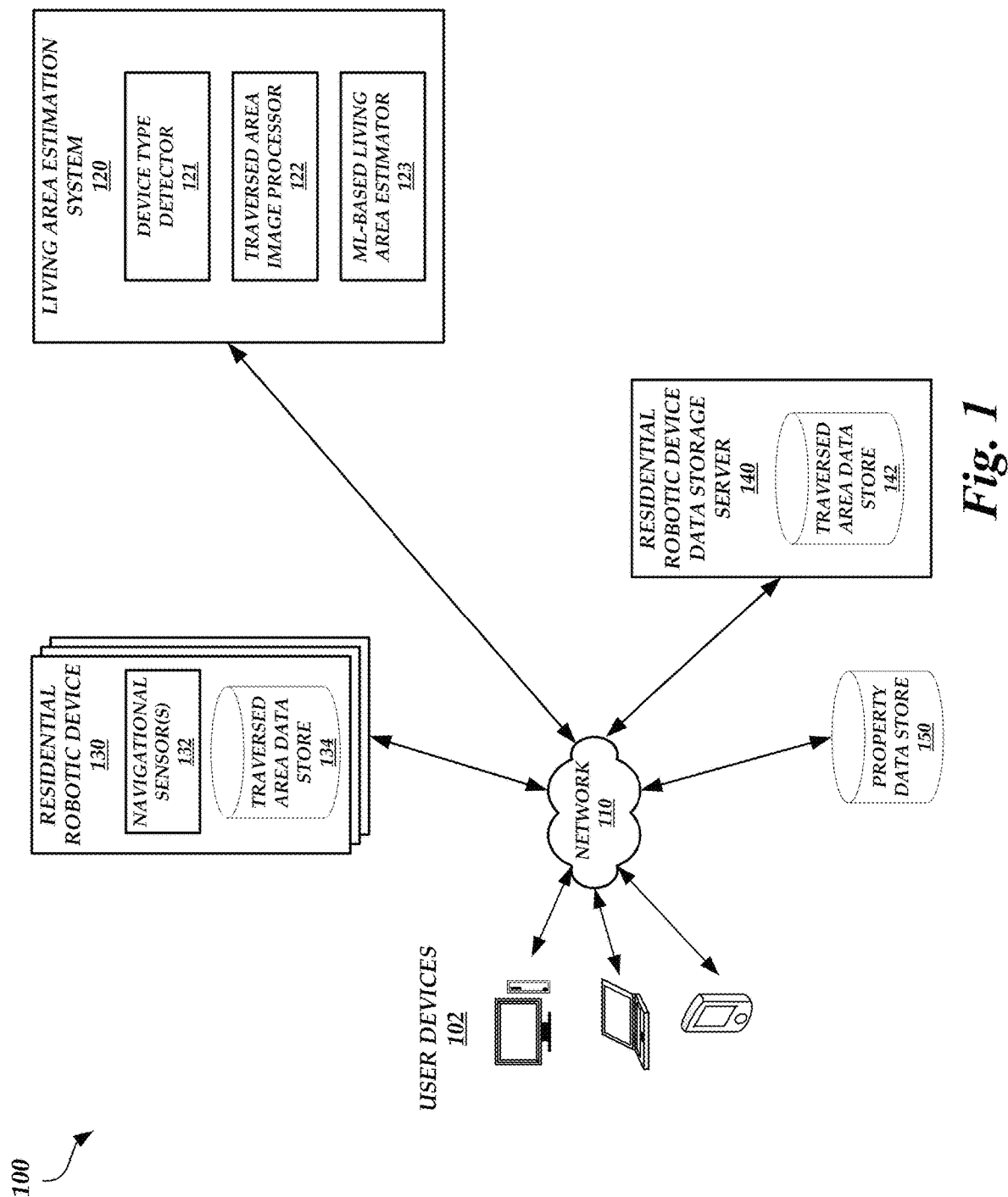
FIG. 1 is a block diagram of an illustrative operating environment in which a living area estimation system uses a residential robotic device and property data to estimate the living area of a structure.

As described above, obtaining an accurate calculation or estimation of the living area of a structure can provide several benefits. It may be difficult, however, to obtain an accurate calculation or estimation of the living area. For example, manual measurements of the living area of a structure (e.g., measurements taken by a human) can be subjective and imprecise. In particular, one person may measure the exterior boundary of a structure to estimate the living area of the structure. However, this type of measurement may fail to take into account areas that are under the area of the roof of the structure, but that are not considered to be the living area of the structure (e.g., a garage, a porch, a terrace, a carport, a balcony, etc.). Another person may try to measure individual rooms and hallways within a structure, but the measurements may be imprecise due to human error (e.g., inaccurate measurements of individual rooms, inability to access certain areas of a floor plan that would be considered in the living area due to furniture or other obstructions, etc.). Even if one could take an accurate measurement of a structure, often it is impractical or impossible to access the structure to take a measurement in the first place (e.g., due to a hazard that makes access impossible, a homeowner not granting permission to access the structure, etc.).

To overcome the subjective and imprecise nature of manual, human measurements and/or to avoid the issue of certain structures being inaccessible, some systems obtain and process aerial images of structures to estimate the living area of the structures. For example, such systems can obtain an aerial image of the roof of a structure, process the aerial image to determine an area covered by the roof, and estimate the area covered by the roof to be equal to the living area. Estimating the living area based solely on aerial imagery, however, can lead to inaccurate results as well. Portions of a structure that fall under the roof may not be considered the living area of the structure. For example, a garage, carport, porch, balcony, terrace, and/or the like may be located under the roof and therefore be inaccurately incorporated into the estimate produced by the system that performs the aerial image processing. Because aerial images are overhead shots, the systems that perform the image processing have no mechanism for determining the number of floors of a structure from the aerial images and/or for determining whether the living area is the same for each floor of the structure. Thus, systems that use aerial image processing to overcome the subjective and imprecise nature of manual, human measurements still suffer from other technical deficiencies.

Similarly, other systems use photographs of the interior of a structure to estimate the living area of a structure and to overcome the subjective and imprecise nature of manual, human measurements and/or to avoid the issue of certain structures being inaccessible. For example, such systems can obtain one or more images of the interior of a structure and can create a two-dimensional and/or three-dimensional model of the interior of the structure based on the image(s). In the process of creating such a model, the system may estimate the living area given the content depicted in the image(s). Estimating the living area based solely on images of the interior of a structure, however, may produce inaccurate results because it can be difficult to obtain a sufficient number of images to cover each corner and section of a particular floor plan. Even if a sufficient number of images could be obtained, furniture, fixtures, and/or other objects may obstruct certain portions of a floor plan and the system may therefore be unable to take into account the area covered by such furniture, fixtures, and/or other objects when estimating the living area.

Accordingly, described herein is an improved living area estimation system that overcomes the technical deficiencies of systems that rely solely on aerial image and/or interior image processing and that provides results that are more objective and accurate than those produced by humans performing manual measurements. For example, the improved living area estimation system can control and/or use data obtained by a residential robotic device that operates within a structure to estimate the living area. In particular, a residential robotic device may navigate along a predetermined or dynamically-determined route on one floor of the structure. As the residential robotic device travels along the route, the residential robotic device can use one or more cameras, one or more light detection and ranging (LIDAR) sensors, one or more radio detection and ranging (RADAR) sensors, one or more accelerators, one or more gyroscopes, one or more clocks, and/or any other appropriate hardware sensor(s) to track the distance covered by the residential robotic device, the direction in which the residential robotic device has and/or is traveling, the speed(s) at which the residential robotic device traveled during operation, the time over which the residential robotic device has been in operation, and/or the area covered by the residential robotic device. The residential robotic device can store information obtained by the hardware sensor(s) locally in memory and/or can transmit the obtained information to a residential robotic device data storage server via a network. The residential robotic device and/or the residential robotic device data storage server can process the obtained information to generate a traversed area map that indicates visually an area covered by the residential robotic device during operation and to generate an estimate of the area covered by the residential robotic device (e.g., in square feet). A user can use a user device to access the traversed area map and/or the area covered estimate, such as via a user interface displayed by a mobile application running on the user device.

The improved living area estimation system can also access the traversed area map and/or the area covered estimate to generate an estimate of the living area of the structure. For example, while the residential robotic device may produce an accurate estimate of the area covered by the residential robotic device, the residential robotic device may not produce an accurate estimate of the living area of the structure within which the residential robotic device operates. Furniture (e.g., beds, dressers, bookcases, sofas, chairs, tables, etc.), fixtures (e.g., lights, faucets, etc.), appliances (e.g., refrigerators, washers, dryers, dishwashers, etc.), fixed structures (e.g., vertical beams, doors, kitchen islands, plumbing, etc.), and/or the like may prevent the residential robotic device from accessing such areas that form part of the living area of the structure. As a result, the traversed area map may be an incomplete map of the floor plan of a structure. Similarly, the estimated area covered by the residential robotic device may be an incomplete estimate of the living area of the floor of the structure on which the residential robotic device operated. In addition, the residential robotic device may only traverse one floor of a multi-floor structure, and therefore the estimated area covered may also be an incomplete estimate of the living area of the structure as a whole. Thus, the improved living area estimation system can use the traversed area map and/or the area covered estimate as a starting point, and use image processing and artificial intelligence to enhance the traversed area map and produce a more accurate estimate of the living area of the structure.

To enhance the traversed area map, the improved living area estimation system can initially determine the type of device and/or manufacture of device from which the traversed area map originates or from which data was obtained to generate the traversed area map. For example, the residential robotic device can be a self-powered robotic vacuum, a remote-controlled vehicle, an unmanned aerial vehicle (e.g., an indoor drone), and/or any other device that is suitable for indoor use, that can move without human assistance, and that has or that can be retrofitted to include one or more sensors used for navigation, object recognition, and/or the like (e.g., one or more sensors from which the direction of the device, the distance traveled by the device, the speed(s) at which the device traveled during operation, the time during which the device was operating, and/or the area covered by the device can be tracked or determined). The information provided to the improved living area estimation may be an image or screenshot of a user interface displayed on a user device that depicts the traversed area map and/or the estimated area covered. The type of device and/or the manufacture of the device may indicate how the traversed area map and/or the estimated area covered information appears in the user interface. Thus, the improved living area estimation system can use the device type and/or manufacturer information to determine how to extract the traversed area map and/or the estimated area covered from the provided image or screenshot.

Once the image or screenshot is obtained, the improved living area estimation system can begin enhancing the traversed area map. For example, the improved living area estimation system can use object character recognition (OCR) to extract, from the image or screenshot, the numerals that represent the estimated area covered. In an embodiment, the improved living area estimation system may blur the image or screenshot prior to performing the text extraction, and search for the string "ft" or "m" to identify a location in the image or screenshot at which the estimated area covered appears (e.g., the text indicating the estimated area covered may appear in the same horizontal line as "ft" or "m" and before (e.g., to the left of) the appearance of "ft" or "m" in the image or screenshot). Once the estimated area covered is extracted, the improved living area estimation system can use the extracted value to determine the resolution of the traversed area map. For example, the area covered by the residential robotic device may be represented by a particular color in the traversed area map. The improved living area estimation system can count the number of pixels in the traversed area map that have the particular color. The improved living area estimation system can then divide the estimated area covered value extracted from the image or screenshot by the number of counted pixels to determine an area per pixel (e.g., square footage per pixel, square meters per pixel, etc.). The improved living area estimation system may eventually use the determined resolution (e.g., the determined area per pixel) to estimate the living area of the floor on which the residential robotic device traversed.

Before, during, and/or after determining the resolution of the traversed area map, the improved living area estimation system can remove noise from or reduce noise in the traversed area map. For example, objects, humans, reflections, and/or other disturbances may interfere with the sensor(s) used by the residential robotic device to determine an area covered by the device, resulting in artifacts or other noise that appear in the traversed area map. As one example, noise or other artifacts may appear as a different color in the traversed area map than the color used to represent the area covered by the residential robotic device. The noise or other artifacts may interfere in the accurate estimation of the living area, and therefore the improved living area estimation system may attempt to reduce or remove the noise or artifacts using an image processing technique. As an illustrative example, the improved living area estimation system can generate a bounding box that surrounds the portion of the traversed area map that represents the area covered by the residential robotic device. The improved living area estimation system may then remove any pixels that reside outside the bounding box and perform a slight dilation (e.g., perform a dilation using a structuring element that is a 2×2 square, a 3×3 square, etc. (e.g., a structuring element that has a first size that is smaller than a size of a structuring element used during a subsequent dilation operation as described below), and repeat the dilation zero times, once, twice, etc.) to form a slightly dilated, traversed area map. Performing the slight dilation may result in a reduction of or removal of the noise or other artifacts. Optionally, the improved living area estimation system can resize the slightly dilated, traversed area map to a set size (e.g., enlarge or shrink the slightly dilated, traversed area map to the set size).

Once the noise is reduced or removed, the improved living area estimation system can fill in holes in the slightly dilated, traversed area map. For example, furniture, fixtures, appliances, or other obstructions may be present in the interior of a floor (e.g., a certain distance inside the structure away from the exterior walls) that prevent the residential robotic device from accessing such space. As a result, the traversed area map may include pixels representing an area covered by the residential robotic device (e.g., pixels having a first color) that surround other pixels that should represent the living area of the floor, but that are represented as being a space not covered by the residential robotic device (e.g., pixels having a second color different than the first color). As one example, the improved living area estimation system can apply further dilation to the slightly dilated, traversed area map. In particular, the improved living area estimation system can determine a dilation amount that is based on the previously-determined resolution of the traversed area map. As an illustrative example, the dilation amount may be the square of a power of ten multiple (e.g., 10, 100, 1000, 10000, etc.) of the area per pixel multiplied by an integer value (e.g., 1, 2, 3, 4, 5, 6, 7, etc.). The improved living area estimation system can then define a structuring element that is larger than the structuring element used in the slight dilation operation (e.g., a structuring element that is a 4×4 square, a 5×5 square, a 6×6 square, etc.) and perform a dilation operation on the slightly dilated, traversed area map using the defined structuring element and repeat the dilation operation a number of times equal to the dilation amount to form a further dilated, traversed area map. The improved living area estimation system can create an open or closed polyline that partially or fully surrounds the further dilated, traversed area map and optionally resize the further dilated, traversed area map to be the set size.

Not only may the residential robotic device be unable to access certain areas in the interior of a floor due to obstructions blocking a path to such areas, the residential robotic device may also be unable to access corners or sides of the floor for similar reasons. Thus, the improved living area estimation system can further modify the further dilated, traversed area map to fill in missing corners and/or sides that were inaccessible or otherwise unseen by the residential robotic device. For example, the improved living area estimation system can create a convex hull polyline that partially or completely surrounds the polyline previously created to partially or fully surround the further dilated, traversed area map. The improved living area estimation system can identify the convex hull defects (e.g., concave areas along the convex hull polyline) and fill in such areas by enclosing each defect line with a bounding box. In particular, the improved living area estimation system can fill in an area if an area of a rectangle formed with convexity defect points is less than a threshold size (e.g., a 60000 pixel by pixel area, a 70000 pixel by pixel area, a 80000 pixel by pixel area, etc.) by either using a bounding box that includes the start and end of the convex hull defect points along the polyline or by using a bounding box that includes the start and end of the convex hull defect points and the concave point falling inside the convex hull polyline. The further dilated, traversed area map that includes the filled in areas may be referred to herein as a filled-in, traversed area map. Optionally, the improved living area estimation system can resize the filled-in, traversed area map to the set size.

The dilation operations may have resulted in an enlargement of the traversed area map. Thus, the improved living area estimation system may erode or shrink the filled-in, traversed area map to restore the map to an original size such that a more accurate living area estimate can be made. For example, the improved living area estimation system can create a polyline that partially or fully surrounds the filled-in, traversed area map (which may be the same as the open or closed polyline that partially or fully surrounds the further dilated, traversed area map) and fill in the area within the polyline such that the area within the polyline shares a same pixel color. The improved living area estimation system can then erode the area within the polyline that shares the same pixel color, such as by using a structuring element that is the same as the one used during the further dilation operation and by repeating the erode operation a number of times that is equal to the number of times that the further dilation operation was repeated (e.g., repeat the erode operation a number of times equal to the dilation amount), to form an eroded, traversed area map. The improved living area estimation system can then form a polyline that partially or fully surrounds the eroded, traversed area map, generate a polygon that includes the area within the polyline, and count a number of pixels within the generated polygon. Optionally, the improved living area estimation system can resize the polygon to the set size.

The generated polygon may represent an enhanced traversed area map that more accurately reflects the living area of a floor of the structure. Thus, the improved living area estimation system can multiply the determined area per pixel by the number of pixels within the generated polygon to produce an estimated living area of the floor on which the residential robotic device operated.

As described herein, the residential robotic device may operate on one floor of a multi-floor structure. Thus, the produced estimated living area of the floor on which the residential robotic device operated may not be fully sufficient to determine the living area of a structure. As a result, the improved living area estimation system can obtain property data for the structure and/or other structures that are neighbors of the structure (e.g., that are located within a certain distance of the structure) or that are considered comparables of the structure (e.g., that have similar structural characteristics as the structure, such as the same number of bedrooms, the same number of bathrooms, the same price point, etc.) and use artificial intelligence in conjunction with the property data and the produced estimated living area of the floor on which the residential robotic device operated to estimate a living area of the structure.

The improved living area estimation can use the property data to train one or more machine learning models to output an estimated living area given an estimated living area produced from the image processing (e.g., an estimated living area of one floor of a structure) and property data of a structure. For example, the improved living area estimation system can perform the training asynchronously from (e.g., prior to or concurrently with) estimating the living area of a structure. To perform the training, the improved living area estimation system can obtain training data formed at least in part from the property data that includes, for one or more structures, an estimated living area of a floor produced by performing the image processing described herein, a number of floors of the structure, a number of bathrooms in the structure, a number of bedrooms in the structure, an actual living area of neighboring and/or comparable structures, a number of floors in neighboring and/or comparable structures, a number of bathrooms in neighboring and/or comparable structures, a number of bedrooms in neighboring and/or comparable structures, and/or any other property data corresponding to the structure and/or neighboring and/or comparable structures. Each set of training data corresponding to a structure may be labeled with an actual living area of the structure.

Once a trained machine learning model is available, the improved living area estimation system can apply the property data of a structure (e.g., a number of floors in the structure, a number of bedrooms in the structure, a number of bathrooms in the structure, etc.) and the produced living area estimate of a floor of the structure as an input to the trained machine learning model. As a result, the trained machine learning model may output a living area estimate. The improved living area estimation system can use this output as the living area estimate for the structure. For the reasons discussed herein, the living area estimate produced by the trained machine learning model may be more accurate than living area estimates produced using other methods. Thus, the improved living area estimation system improves upon existing technical living area estimation systems, leveraging residential robotic devices and image processing techniques to provide this improvement.

While the residential robotic device is described herein as being a self-powered device or remote-controlled vehicle, this is not meant to be limiting. Any IoT device, such as any mobile device (e.g., cell phone, tablet, laptop, watch, electronic glasses, video game controller, video game console, human wearable device, electronic pet collar, etc.), that has or that can be retrofitted with the appropriate sensors, such as those described herein, can be used to produce a traversed area map and/or to estimate an area covered for use by the improved living area estimation system. As described herein, a residential robotic device can also be used to determine an outdoor area of a parcel and/or a total area of a parcel (e.g., an area that includes the living area of one or more structures and an outdoor area). In such a situation, the residential robotic device can be a self-powered or remote-controlled device suitable for outdoor use, such as an unmanned aerial vehicle (e.g., an outdoor drone), an automated lawn mower, a mobile device, a remote-controlled vehicle, and/or the like.

Furthermore, the residential robotic device does not necessarily need to be a device that moves, whether automatically or with human assistance. For example, the residential robotic device can be a stationary device that can communicate with one or more outposts via a wireless connection to estimate an area and/or floor plan of a room, a living space, etc. Example stationary devices can include a refrigerator, a smart television, a gaming console, a smart thermostat, a wireless router, and/or the like.

While the improved living area estimation system is described herein as estimating the living area of a structure on a parcel, the structure is not limited to a building on the parcel. The structure can include fences, sheds, greenhouses, vehicles, and/or other physical objects located on the parcel that have a roof.

The foregoing aspects and many of the attendant advantages of this disclosure will become more readily appreciated as the same become better understood by reference to the following detailed description, when taken in conjunction with the accompanying drawings.

Example Residential Robotic Device-Based Living Area Estimation Environment

FIG. 1 is a block diagram of an illustrative operating environment 100 in which a living area estimation system 120 uses a residential robotic device 130 and property data to estimate the living area of a structure. The operating environment 100 further includes one or more residential robotic devices 130 that may communicate with the living area estimation system 120 via a network 110 to provide traversed area data that indicates a portion and/or area of a floor plan on which the respective residential robotic device 130 operated. In addition, the operating environment 100 includes a residential robotic device data storage server 140 and one or more property data stores 150 with which the living area estimation system 120 may communicate via the network 110 to obtain data used in estimating the living area. Furthermore, the operating environment 100 includes various user devices 102 that may communicate with the living area estimation system 120 to provide traversed area data and/or to request the living area of a particular structure.

The residential robotic device 130 may be a device or vehicle that operates at least indoors and that can navigate an indoor space automatically via the use of one or more navigational sensors 132. For example, the residential robotic device 130 can be a self-powered robotic vacuum, a remote-controlled vehicle, an unmanned aerial vehicle (e.g., an indoor drone), and/or any other device that is suitable for indoor use, that can move without human assistance (e.g., without a human physically touching and propelling the residential robotic device 130), and that has or that can be retrofitted to include one or more navigational sensors 132 used for navigation, object recognition, and/or the like (e.g., one or more navigational sensors 132 from which the direction of the residential robotic device 130, the distance traveled by the residential robotic device 130, the speed(s) at which the residential robotic device 130 traveled during operation, the time during which the residential robotic device 130 was operating, and/or the area covered by the residential robotic device 130 can be tracked or determined). Examples of a navigational sensor 132 can include a hardware sensor, such as a camera, a LIDAR sensor, a RADAR sensor, an accelerator, a gyroscope, a clock, and/or any other appropriate hardware sensor to track the distance covered by the residential robotic device 130, the direction in which the residential robotic device 130 has and/or is traveling, the speed(s) at which the residential robotic device 130 traveled during operation, the time over which the residential robotic device 130 has been in operation, and/or the area covered by the residential robotic device 130.

The residential robotic device 130 can store information obtained by the navigational sensor(s) 132 locally in memory (e.g., in traversed area data store 134) and/or can transmit the obtained information to the residential robotic device data storage server 140 via the network 110. The information obtained by the navigational sensor(s) 132 may be associated in the traversed area data store 134 and/or in the residential robotic device data storage server 140 with a particular operating session during which the information was obtained. The residential robotic device 130 and/or the residential robotic device data storage server 140 can process the obtained information to generate a traversed area map that indicates visually an area covered by the residential robotic device 130 during an operating session and to generate an estimate of the area covered by the residential robotic device 130 (e.g., in square feet, in square meters, etc.) during the operating session. For example, the residential robotic device 130 and/or the residential robotic device data storage server 140 can process the obtained information by parsing the information to determine a speed at which the residential robotic device 130 traveled in one or more directions and the time it took the residential robotic device 130 to travel in the one or more directions. By determining this information, the residential robotic device 130 and/or the residential robotic device data storage server 140 may be able to calculate a distance (e.g., in feet or meters) covered by the residential robotic device 130 in each direction. The residential robotic device 130 and/or the residential robotic device data storage server 140 can combine the calculated distance traveled in the one or more directions to determine an area (e.g., in square feet or square meters) covered by the residential robotic device 130. The residential robotic device 130 and/or residential robotic device data storage server 140 can then generate one or more polygons that graphically represent the determined area to form the traversed area map. The traversed area map may resemble a two-dimensional or three-dimensional floor plan in which pixels that represent the area covered by the residential robotic device 130 are shaded or colored (e.g., blue, magenta, red, green, etc.) and the pixels that represent the area not covered by the residential robotic device 130 have a default shade or color (e.g., white). A user can use a user device 102 to access the traversed area map and/or the area covered estimate, such as via a user interface displayed by a mobile application running on the user device 102. The residential robotic device 130 may include one or more hardware processors configured with computer-executable instructions that, when executed by the hardware processor(s), cause the hardware processor(s) to generate the traversed area map and/or estimate the area covered by the residential robotic device 130 using the information obtained from the navigational sensor(s) 132.

As an illustrative example, a self-powered robotic vacuum may be a residential robotic device 130 that traverses along a predetermined or dynamically determined route on one floor of a structure during a single session to clean flooring. The self-powered robotic vacuum may track the area of the floor that was accessed and cleaned and/or areas of the floor that were not accessed. The self-powered robotic vacuum can store this information internally and/or provide this information to the residential robotic device data storage server 140 or a user device 102. Either the self-powered robotic vacuum or the residential robotic device data storage server 140 can process this information to generate a traversed area map and/or to calculate the area covered by the self-powered robotic vacuum, which can be displayed by the user device 102 in a user interface.

While the residential robotic device 130 is described herein as traversing along a route on one floor of a structure, this is not meant to be limiting. The same residential robotic device 130 can function on multiple floors over a period of time, and data captured on some or all of the floors can be used by the living area estimation system 120 to estimate the living area of a structure in the manner described herein. Alternatively or in addition, multiple different residential robotic devices 130 can each operate on a different floor, and the data captured by the multiple residential robotic devices 130 can be used by the living area estimation system 120 to estimate the living area of a structure in the manner described herein. For example, the living area estimation system 120 can estimate the living area of some or all of the floors using data corresponding to the respective floor. The living area estimation system 120 can then add the living area estimates to determine a final living area estimate of the structure (e.g., if data is captured for each floor of the structure) and/or can apply some or all of the living area estimates and/or the property data of the structure as an input to a trained machine learning model to determine a living area estimate for the structure. Use of the trained machine learning model is described in greater detail below.

In some embodiments, a single floor of a structure may have multiple levels or heights (e.g., a recessed level and a normal level) and/or areas that are separated (e.g., by a physical barrier, such as a wall). The same residential robotic can function on multiple levels and/or in different areas of the same floor over a period of time, and data captured on some or all of the floors can be used by the living area estimation system 120 to estimate the living area of a structure in the manner described herein. Alternatively or in addition, multiple different residential robotic devices 130 can each operate on a different level or area of a single floor, and the data captured by the multiple residential robotic devices 130 can be used by the living area estimation system 120 to estimate the living area of a structure in the manner described herein. For example, the living area estimation system 120 can estimate the living area of some or all of the floors using data corresponding to the respective floor. The living area estimation system 120 can then add the living area estimates to determine a final living area estimate of the structure (e.g., if data is captured for each floor of the structure) and/or can apply some or all of the living area estimates and/or the property data of the structure as an input to a trained machine learning model to determine a living area estimate for the structure. Use of the trained machine learning model is described in greater detail below.

While the residential robotic device 130 is described herein as being a self-powered device or remote-controlled vehicle, this is not meant to be limiting. Any IoT device, such as any mobile device (e.g., cell phone, tablet, laptop, watch, electronic glasses, video game controller, video game console, human wearable device, etc.), that has or that can be retrofitted with the appropriate navigational sensors, such as those described herein, can be used to produce a traversed area map and/or to estimate an area covered for use by the living area estimation system 120. For example, a human can carry a cell phone indoors on a particular floor, and the cell phone can track the area traveled by the human and generate a traversed area map and/or estimate the area covered by the human and/or cell phone.

The living area estimation system 120 can be a computing system configured to estimate the living area of a structure. For example, the living area estimation system 120 can obtain traversed area data and/or property data from external data sources and use some or all of the data to estimate the living area.

The living area estimation system 120 may be a single computing device, or it may include multiple distinct computing devices, such as computer servers, logically or physically grouped together to collectively operate as a server system. The components of the living area estimation system 120 can each be implemented in application-specific hardware (e.g., a server computing device with one or more ASICs) such that no software is necessary, or as a combination of hardware and software. In addition, the modules and components of the living area estimation system 120 can be combined on one server computing device or separated individually or into groups on several server computing devices. In some embodiments, the living area estimation system 120 may include additional or fewer components than illustrated in FIG. 1.

In some embodiments, the features and services provided by the living area estimation system 120 may be implemented as web services consumable via the communication network 110. In further embodiments, the living area estimation system 120 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The living area estimation system 120 may include various modules, components, data stores, and/or the like to provide the roof area estimation functionality described herein. For example, the living area estimation system 120 may include a device type detector 121, a traversed area image processor 122, and a machine learning-based living area estimator 123.

The device type detector 121 can determine the type of device 130 and/or manufacture of device 130 from which the traversed area map originates or from which data was obtained to generate the traversed area map. For example, the traversed area data provided to the living area estimation system 120 may be an image or screenshot of a user interface displayed on a user device 102 that depicts the traversed area map and/or the estimated area covered by the residential robotic device 130. As another example, the traversed area data provided to the living area estimation system 120 may be an image of a traversed area map and of a numerical value representing an estimated area covered by the residential robotic device 130 (e.g., raw data generated by the residential robotic device 130 and/or the residential robotic device data storage server 140 received via, for example, an application programming interface (API)). The type of device 130 and/or the manufacture of the device 130 may indicate how the traversed area map and/or the estimated area covered information appears in the image or user interface, and the device type detector 121 may have access to a data store that stores image processing or extraction instructions for different types of residential robotic devices 130. Thus, the device type detector 121 can use the device type and/or manufacturer information to determine image processing and/or extraction instructions that define how to extract the traversed area map and/or the estimated area covered from the provided image or screenshot. The device type detector 121 can forward the appropriate image processing or extraction instructions to the traversed area image processor 122.

Once the image or screenshot is obtained, the traversed area image processor 122 can begin enhancing the traversed area map. For example, the traversed area image processor 122 can use OCR to extract, from the image or screenshot, the numerals that represent the estimated area covered. In an embodiment, the traversed area image processor 122 may blur the image or screenshot prior to performing the text extraction, and search for a string identifying a distance unit (e.g., "ft" or "m") to identify a location in the image or screenshot at which the estimated area covered appears. As an illustrative example, the text indicating the estimated area covered may appear in the image or screenshot in the same horizontal line as "ft" or "m" and before (e.g., to the left of) the appearance of "ft" or "m" in the image or screenshot). Once the location is identified, the traversed area image processor 122 can extract the text representing the estimated area covered.

Once the estimated area covered is extracted, the traversed area image processor 122 can use the extracted value to determine the resolution of the traversed area map. For example, the area covered by the residential robotic device 130 may be represented by a particular color in the traversed area map (e.g., pixels in the traversed area map may be shaded or colored a particular color to indicate the area covered by the residential robotic device 130). The traversed area image processor 122 can count the number of pixels in the traversed area map that have the particular color. The traversed area image processor 122 can then divide the estimated area covered value extracted from the image or screenshot by the number of counted pixels to determine an area per pixel (e.g., square footage per pixel, square meters per pixel, etc.). The traversed area image processor 122 may eventually use the determined resolution (e.g., the determined area per pixel) to estimate the living area of the floor on which the residential robotic device 130 traversed.

Before, during, and/or after determining the resolution of the traversed area map, the traversed area image processor 122 can remove noise from or reduce noise in the traversed area map. For example, objects, humans, reflections, and/or other disturbances may interfere with the sensor(s) used by the residential robotic device 130 to determine an area covered by the device 130, resulting in artifacts or other noise that appear in the traversed area map. As one example, noise or other artifacts may appear as a different color (e.g., black) in the traversed area map than the color used to represent the area covered by the residential robotic device 130 (e.g., blue, magenta, green, etc.). The noise or other artifacts may interfere in the accurate estimation of the living area, and therefore the traversed area image processor 122 may attempt to reduce or remove the noise or artifacts using an image processing technique. As an illustrative example, the traversed area image processor 122 can generate a bounding box that surrounds the portion of the traversed area map that represents the area covered by the residential robotic device 130. The traversed area image processor 122 may then remove any pixels that reside outside the bounding box and perform a slight dilation to form a slightly dilated, traversed area map. In an embodiment, the traversed area image processor 122 performs a slight dilation by using a structuring element that has a first size (e.g., a 2×2 pixel square, a 3×3 pixel square, etc.) that is smaller than a size of a structuring element used during a subsequent dilation operation as described below, and repeating the dilation a small number of times (e.g., zero times, once, twice, etc.). During the dilation operation, the traversed area image processor 122 may iterate through some or all of the pixels of the traversed area map and, for each pixel, use the structuring element to identify pixels that neighbor the respective pixel (e.g., the structuring element may be centered on the respective pixel and a neighboring pixel may be considered a pixel that falls within the structuring element). The traversed area image processor 122 may then change the value (e.g., color) of the respective pixel to a value (e.g., color) used to represent the area covered by the residential robotic device 130 if any of the neighboring pixels has a value (e.g., color) used to represent the area covered by the residential robotic device 130 and the respective pixel is not already that value. Thus, the slight dilation operation may result in a slightly dilated, traversed area map that has more pixels with the color used to represent the area covered by the residential robotic device 130 than the original traversed area map. In addition, performing the slight dilation may result in a reduction of or removal of the noise or other artifacts given that at least some pixels previously depicting noise may now be changed to have a value (e.g., color) representing the area covered by the residential robotic device 130. Optionally, the traversed area image processor 122 can resize the slightly dilated, traversed area map to a set size (e.g., enlarge or shrink the slightly dilated, traversed area map to the set size).

Once the noise is reduced or removed, the traversed area image processor 122 can fill in holes in the slightly dilated, traversed area map. For example, furniture, fixtures, appliances, or other obstructions may be present in the interior of a floor (e.g., a certain distance inside the structure away from the exterior walls) that prevent the residential robotic device 130 from accessing such space. As a result, the traversed area map may include pixels representing an area covered by the residential robotic device 130 (e.g., pixels having a first color) that surround other pixels that should represent the living area of the floor, but that are represented as being a space not covered by the residential robotic device 130 (e.g., pixels having a second color different than the first color). As one example, the traversed area image processor 122 can apply further dilation to the slightly dilated, traversed area map to fill in the holes. In particular, the traversed area image processor 122 can determine a dilation amount that is based on the previously-determined resolution of the traversed area map and that is used to apply the further dilation.

As an illustrative example, the dilation amount may be an integer value based on the previously-determined resolution of the traversed area map, such as an integer value of (1) the square of a power of ten multiple (e.g., 10, 100, 1000, 10000, etc.) of the area per pixel multiplied by (2) an integer value (e.g., 1, 2, 3, 4, 5, 6, 7, etc.). The traversed area image processor 122 can then define a structuring element that is larger than the structuring element used in the slight dilation operation (e.g., a structuring element that is a 4×4 square, a 5×5 square, a 6×6 square, etc.) and perform a dilation operation on the slightly dilated, traversed area map using the defined structuring element and repeat the dilation operation a number of times equal to the dilation amount to form a further dilated, traversed area map. Similar to the operation described above, during the dilation operation, the traversed area image processor 122 may iterate through some or all of the pixels of the slightly dilated, traversed area map and, for each pixel, use the larger structuring element to identify pixels that neighbor the respective pixel (e.g., the structuring element may be centered on the respective pixel and a neighboring pixel may be considered a pixel that falls within the structuring element). The traversed area image processor 122 may then change the value (e.g., color) of the respective pixel to a value (e.g., color) used to represent the area covered by the residential robotic device 130 if any of the neighboring pixels has a value (e.g., color) used to represent the area covered by the residential robotic device 130 and the respective pixel is not already that value. The traversed area image processor 122 can create an open or closed polyline that partially or fully surrounds the further dilated, traversed area map and optionally resize the further dilated, traversed area map to be the set size.

Not only may the residential robotic device 130 be unable to access certain areas in the interior of a floor due to obstructions blocking a path to such areas, the residential robotic device 130 may also be unable to access corners or sides of the floor for similar reasons. Thus, the traversed area image processor 122 can further modify the further dilated, traversed area map to fill in missing corners and/or sides that were inaccessible or otherwise unseen by the residential robotic device 130. For example, the traversed area image processor 122 can use another polyline that partially or completely surrounds the polyline previously created to partially or fully surround the further dilated, traversed area map to fill in missing corners and/or sides. As an illustrative example, the traversed area image processor 122 can create a convex hull polyline that partially or completely surrounds the polyline previously created to partially or fully surround the further dilated, traversed area map. The traversed area image processor 122 can identify the convex hull defects (e.g., concave areas along the convex hull polyline) and fill in such areas by enclosing each portion of the convex hull polyline corresponding to a defect with a bounding box. In particular, the traversed area image processor 122 can fill in an area along the convex hull polyline if an area of a polygon (e.g., a rectangle, hexagon, etc.) formed with convexity defect points (e.g., formed by enclosing a portion of the convex hull polyline corresponding to a defect with a bounding box) is less than a threshold size (e.g., a 60000 pixel by pixel area, a 70000 pixel by pixel area, a 80000 pixel by pixel area, etc.) by either using a bounding box that includes the start and end of the portion of the convex hull polyline that corresponds to a defect or by using a bounding box that includes the start and end of the portion of the convex hull polyline that corresponds to a defect and the concave point falling inside the portion of the convex hull polyline that corresponds to a defect. The further dilated, traversed area map that includes the filled in areas may be referred to herein as a filled-in, traversed area map. Optionally, the traversed area image processor 122 can resize the filled-in, traversed area map to the set size.

Filling in missing corners and/or sides may be an optional operation performed by the traversed area image processor 122. For example, corners and/or sides may not need to be filled in if the residential robotic device 130 is able to access all areas in the interior of a floor.

The dilation operations may have resulted in an enlargement of the original traversed area map. Thus, the traversed area image processor 122 may erode or shrink the filled-in, traversed area map to restore the map to an original size such that a more accurate living area estimate can be made. For example, the traversed area image processor 122 can create a polyline that partially or fully surrounds the filled-in, traversed area map (which may be the same as the open or closed polyline that partially or fully surrounds the further dilated, traversed area map) and fill in the area within the polyline (e.g., change the value (e.g., color) of any pixels in the area within the polyline that do not have a value representing an area covered by the residential robotic device 130 to have the value representing an area covered by the residential robotic device 130) such that the area within the polyline shares a same pixel color. The traversed area image processor 122 can then erode the area within the polyline that shares the same pixel color, such as by using a structuring element that is the same as the one used during the further dilation operation and by repeating the erode operation a number of times that is equal to the number of times that the further dilation operation was repeated (e.g., repeat the erode operation a number of times equal to the dilation amount), to form an eroded, traversed area map. During the erode operation, the traversed area image processor 122 may iterate through some or all of the pixels of the filled-in, traversed area map and, for each pixel, use the structuring element to identify pixels that neighbor the respective pixel (e.g., the structuring element may be centered on the respective pixel and a neighboring pixel may be considered a pixel that falls within the structuring element). The traversed area image processor 122 may then change the value (e.g., color) of the respective pixel to a value (e.g., color) not used to represent the area covered by the residential robotic device 130 if any of the neighboring pixels has a value (e.g., color) not used to represent the area covered by the residential robotic device 130 and the respective pixel is not already that value. The traversed area image processor 122 can then form a polyline that partially or fully surrounds the eroded, traversed area map, generate a polygon that includes the area within the formed polyline, and count a number of pixels within the generated polygon. Optionally, the traversed area image processor 122 can resize the polygon to the set size.

The generated polygon may represent an enhanced traversed area map that more accurately reflects the living area of a floor of the structure. Thus, the traversed area image processor 122 can multiply the determined area per pixel by the number of pixels within the generated polygon to produce an estimated living area of the floor on which the residential robotic device 130 operated.

As described herein, the residential robotic device 130 may operate on one floor of a multi-floor structure. Thus, the produced estimated living area of the floor on which the residential robotic device 130 operated may not be fully sufficient to determine the living area of a structure (e.g., if the structure has multiple stories). As a result, the machine learning-based living area estimator 123 can obtain property data for the structure and/or other structures that are neighbors of the structure (e.g., that are located within a certain distance of the structure) or that are considered comparables of the structure (e.g., that have similar structural characteristics as the structure, such as the same number of bedrooms, the same number of bathrooms, the same price point, etc.) and use artificial intelligence in conjunction with the property data and the produced estimated living area of the floor on which the residential robotic device 130 operated to estimate a living area of the structure.

Prior to and/or concurrently with estimating a living area of a structure, the machine learning-based living area estimator 123 can use the property data to train one or more machine learning models to output an estimated living area given an estimated living area produced from the image processing (e.g., an estimated living area of one floor of a structure produced by the traversed area image processor 122) and property data of a structure. For example, the machine learning-based living area estimator 123 can perform the training asynchronously from (e.g., prior to or concurrently with) estimating the living area of a structure. To perform the training, the machine learning-based living area estimator 123 can obtain training data formed at least in part from the property data that includes, for one or more structures, an estimated living area of a floor produced by performing the image processing described herein (e.g., produced by the traversed area image processor 122 using some or all of the operations described herein), a number of floors of the structure, a number of bathrooms in the structure, a number of bedrooms in the structure, an actual living area of neighboring and/or comparable structures, a number of floors in neighboring and/or comparable structures, a number of bathrooms in neighboring and/or comparable structures, a number of bedrooms in neighboring and/or comparable structures, and/or any other property data corresponding to the structure and/or neighboring and/or comparable structures. Each set of training data corresponding to a structure may be labeled with an actual living area of the structure. The machine learning-based living area estimator 123 can then use the training data to train one or more machine learning models to output an estimated living area.

Once a trained machine learning model is available, the machine learning-based living area estimator 123 can apply the property data of a structure (e.g., a number of floors in the structure, a number of bedrooms in the structure, a number of bathrooms in the structure, etc.) and the produced living area estimate of a floor of the structure (e.g., the living area estimate output by the traversed area image processor 122 in response to performing some or all of the operations described herein) as an input to the trained machine learning model. As a result, the trained machine learning model may output a living area estimate. The machine learning-based living area estimator 123 can use this output as the living area estimate for the structure. For the reasons discussed herein, the living area estimate produced by the trained machine learning model may be more accurate than living area estimates produced using other methods. Thus, the living area estimation system 120 improves upon existing technical living area estimation systems, leveraging residential robotic devices and image processing techniques to provide this improvement.

The residential robotic device data storage server 140 can be a computing system configured to store and provide access to traversed area data. For example, the residential robotic device data storage server 140 can obtain traversed area data from one or more residential robotic devices 130 via the network 110. Alternatively or in addition, the residential robotic device data storage server 140 can obtain raw navigational sensor 132 information or data from the residential robotic device(s) 130 and process the information in a manner as described herein to generate the traversed area data. The residential robotic device data storage server 140 can store traversed area data in traversed area data store 142 in an entry associated with the residential robotic device 130 from which the data originates and an operating session from which the traversed area data is generated. As described herein, the residential robotic device data storage server 140 can provide traversed area data to the living area estimation system 120, such as in response to one or more API calls sent by the living area estimation system 120.

The residential robotic device data storage server 140 may be a single computing device, or it may include multiple distinct computing devices, such as computer servers, logically or physically grouped together to collectively operate as a server system. The components of the residential robotic device data storage server 140 can each be implemented in application-specific hardware (e.g., a server computing device with one or more ASICs) such that no software is necessary, or as a combination of hardware and software. In addition, the modules and components of the residential robotic device data storage server 140 can be combined on one server computing device or separated individually or into groups on several server computing devices. In some embodiments, the residential robotic device data storage server 140 may include additional or fewer components than illustrated in FIG. 1.

In some embodiments, the features and services provided by the residential robotic device data storage server 140 may be implemented as web services consumable via the communication network 110. In further embodiments, the residential robotic device data storage server 140 is provided by one more virtual machines implemented in a hosted computing environment. The hosted computing environment may include one or more rapidly provisioned and released computing resources, which computing resources may include computing, networking and/or storage devices.

The property data store 150 may store property data associated with one or more structures on one or more parcels. While the property data store 150 is depicted as being external to the living area estimation system 120, this is not meant to be limiting. For example, not shown, the property data store 150 can be located internal to the living area estimation system 120.

In further embodiments, the residential robotic device 130 and/or multiple residential robotic devices 130 can be used by the living area estimation system 120 to not only estimate the living area of a structure, but also to estimate the square footage of a parcel on which the structure is located. For example, the residential robotic device 130 can operate indoors and/or outdoors and can include one or more navigational sensors (e.g., global positioning system (GPS) sensors, wide area network sensors, etc.) to generate a map of an indoor and/or outdoor space over which the residential robotic device 130 traverses and/or can include other sensors, such as those described herein, to calculate a square footage or square meter area covered by the residential robotic device 130 during an operating session. The living area estimation system 120 can process outdoor traversed area data in the same manner as indoor traversed area data described herein to estimate an outdoor and/or total area (e.g., in square feet, square meters, etc.) of a parcel. If the living area estimation system 120 uses the outdoor traversed area data to estimate an outdoor area of a parcel, the living area estimation system 120 can combine the estimated outdoor area with the estimated living area of a floor (e.g., the ground floor) to estimate the total area of a parcel. If a parcel includes multiple structures, then the living area estimation system 120 can add the estimated outdoor area to estimates of the living area of a floor of each of the structures.

As an illustrative example, the residential robotic device 130 could be an automated lawn mower that traverses an outdoor space of a parcel (e.g., to mow the lawn). The living area estimation system 120 can obtain outdoor traversed area data directly or indirectly from the automated lawn mower to estimate an outdoor area of the parcel using the operations described herein. The same residential robotic device 130 or a different residential robotic device 130 (e.g., a self-powered vacuum) may collect data for generating indoor traversed area data, and the living area estimation system 120 can obtain the indoor traversed area data to estimate the living area of a floor on which the residential robotic device 130 traversed. The living area estimation system 120 can then combine the estimated outdoor area with the estimated living area of the floor to determine an estimated total area of the parcel. Thus, the same residential robotic device 130 or different residential robotic devices 130 that may or may not be of the same type (e.g., self-powered vacuum, automated lawn mower, electronic pet collar, etc.) can be used to produce data that, when processed by the living area estimation system 120, causes the living area estimation system 120 to estimate a total area of a parcel. In fact, different types of residential robotic devices 130 can each generate data that, when processed by the living area estimation system 120, causes the living area estimation system 120 to estimate a living area of a floor, a living area of a structure, and/or an outdoor area of a parcel.

In further embodiments, the living area estimation system 120 can estimate not only the living area of a floor or structure, but also the ceiling height of a floor of a structure and/or the elevation of a floor of a structure. For example, a residential robotic device 130 may be configured with one or more sensors that may detect a distance between the residential robotic device 130 and a ceiling or other obstruction above the residential robotic device 130. Such sensors can include LIDAR sensor(s), RADAR sensor(s), sound navigation and ranging (SONAR) sensor(s), infrared sensor(s), and/or the like. As the residential robotic device 130 navigates along the route, the residential robotic device 130 may store the distance between the residential robotic device 130 and the ceiling or other obstruction at regular intervals (e.g., every foot, every centimeter, etc.). The traversed area data may include the detected distances, and the living area estimation system 120 can extract the distances from the traversed area data. For portions of the original traversed area map that are modified by the living area estimation system 120 (e.g., filled in) to form the polygon or enhanced traversed area map, the living area estimation system 120 can use the polygon and the extracted distances to interpolate or otherwise determine what the distance between the residential robotic device 130 and the ceiling or other obstruction would have been calculated in the modified area(s) had the residential robotic device 130 been able to traverse those area(s). By estimating the living area of a floor and estimating the ceiling or other obstruction height throughout the floor, the living area estimation system 120 can generate a three-dimensional model of the floor (e.g., a model showing how the ceiling changes, if at all, throughout different portions of the floor). The living area estimation system 120 can repeat these operations for some or all of the floors of a structure. The living area estimation system 120 may also combine the three-dimensional models of multiple floors to create a three-dimensional model of the structure.

As another example, a residential robotic device 130 may include an altimeter. As the residential robotic device 130 navigates along the route, the residential robotic device 130 may store the surface elevation measured by the altimeter at regular intervals (e.g., every foot, every centimeter, etc.). The traversed area data may include the measured elevation, and the living area estimation system 120 can extract the measured elevations from the traversed area data. For portions of the original traversed area map that are modified by the living area estimation system 120 (e.g., filled in), the living area estimation system 120 can use the extracted elevations to interpolate or otherwise determine what elevation would have been measured in the modified area(s) had the residential robotic device 130 been able to traverse those area(s). The living area estimation system 120 can repeat these operations for some or all of the floors of a structure.

In further embodiments, the living area estimation system 120 can determine features of a structure using traversed area data. Features of the structure can include a number of bedrooms in the structure, a number of bathrooms in the structure, and/or other enriched data elements (e.g., bathroom distance to a bedroom on a same floor, bathroom distance to a bedroom on a different floor, whether the structure includes an open floor plan, bedroom size, bathroom size, whether the closet is a walk-in closet, whether the floor is furnished, etc.). For example, a residential robotic device 130 can capture one or more images while traversing along the route, associating each image with a location at which the image was captured. The living area estimation system 130 (e.g., the traversed area image processor 122) can process one or more of these images to detect the type of furniture depicted in the image(s), if present. If the living area estimation system 120 determines that bedroom furniture is depicted in the image(s) corresponding to a particular area of a floor, then the living area estimation system 120 may determine that that the space is furnished and that the area of the floor is a bedroom. The living area estimation system 120 can repeat these operations one or more times and count the number of times an area is identified as being a bedroom. The living area estimation system 120 may then estimate that the floor of the structures includes a number of bedrooms that equals the number of times an area is identified as being a bedroom. These operations can be repeated for one or more floors, which allows the living area estimation system 120 to estimate the number of bedrooms in the structure. Similarly, the living area estimation system 120 may detect living room furniture, kitchen furniture, bathroom furniture, etc., and estimate the number of such rooms in a similar manner. If no furniture is detected in any images captured by the residential robotic device, then the living area estimation system 120 may determine that the floor is not furnished.

Alternatively or in addition, the living area estimation system 120 can process an enhanced traversed area map to determine the location of one or more bathrooms once one or more bedrooms are identified. For example, a bathroom may be smaller in size than a bedroom and close to a location of a bedroom. Thus, the living area estimation system 120 may be able to identify the location of bathrooms by locating, in the traversed area map, rooms that are smaller than, but close to, one or more bedrooms. These operations can be repeated for one or more floors, which allows the living area estimation system 120 to estimate the location of and/or the number of bathrooms in the structure. Having knowledge of the estimated location of one or more bathrooms and one or more bedrooms may allow the living area estimation system 120 to further estimate the distance between a bathroom and a bedroom, regardless of whether the two rooms are on the same or different floor. The living area estimation system 120 can further use the enhanced traversed area map to determine whether any walls separate one room from another room (e.g., a kitchen from a living room), which may indicate whether the floor plan is open. The living area estimation system 120 can also use the enhanced traversed area map and the determined resolution to measure the size of an identified room and/or the size of a closet (where a closet having at least a threshold size may indicate that the closet is a walk-in closet).

In some embodiments, the living area estimation system 120 may use artificial intelligence (e.g., machine learning) and/or pattern matching to identify types of furniture in captured images, the type of room given the type of furniture identified, to estimate the number of bedrooms and/or bathrooms in a structure given the number estimated for one floor of a structure, the location of a bathroom given a known location of a bedroom, and/or any of the enriched data elements. For example, the living area estimation system 120 may compile training data that includes captured images, features of a structure, a traversed area map, etc. that are labeled with the information that is to be predicted (e.g., types of furniture in captured images, the type of room given the type of furniture identified, the number of bedrooms and/or bathrooms in a structure, the location of a bathroom, and/or any of the enriched data elements). The living area estimation system 120 can train a machine learning model using the training data, where the trained machine learning model outputs the information that is to be predicted when presented with one or more inputs that can include captured images, an enhanced traversed area map, etc.

Figure 2:
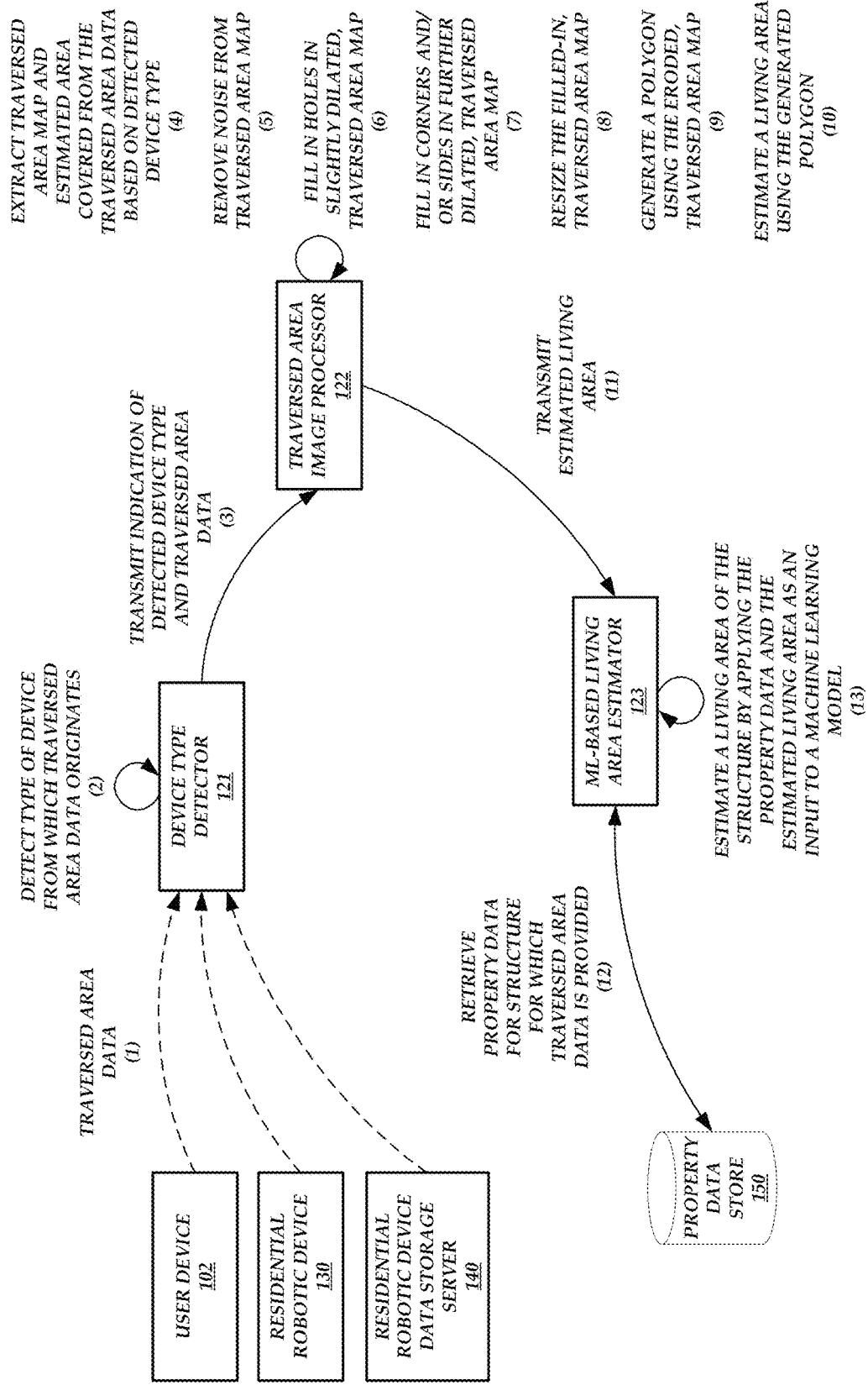
FIG. 2 is a flow diagram illustrating the operations performed by the components of the operating environment of FIG. 1 to estimate a living area of a structure.

Example Block Diagrams for Estimating Living Area Using a Residential Robotic Device FIG. 2 is a flow diagram illustrating the operations performed by the components of the operating environment 100 of FIG. 1 to estimate a living area of a structure. As illustrated in FIG. 2, either a user device 102, a residential robotic device 130, or a residential robotic device data storage server 140 transmits traversed area data (e.g., an image or screenshot of a traversed area map and/or an estimated area covered; an image of the traversed area map and a numerical value representing the estimated area covered; etc.) to the device type detector 121 at (1). For example, the user device 102 may receive traversed area data from the residential robotic device 130 or the residential robotic device data storage server 140 and optionally display the traversed area data in a user interface. A user can take a screenshot of the user interface and provide the screenshot to the device type detector 121. Alternatively or in addition, the user can select an option via the user interface to transmit the traversed area data from the user device 102 to the device type detector 121. Alternatively or in addition, the user device 102 can receive raw navigational sensor 132 data or information from the residential robotic device 130 and generate traversed area data using the navigational sensor 132 data or information in a manner as described herein. The residential robotic device data storage server 140 may receive the traversed area data from the residential robotic device 130 or may receive raw navigational sensor 132 data or information from the residential robotic device 130 and generate traversed area data using the navigational sensor 132 data or information in a manner as described herein. The residential robotic device data storage server 140 can transmit the traversed area data to the device type detector 121 automatically when received or generated or in response to an API call received from the device type detector 121 or user device 102.

The device type detector 121 may detect the type and/or manufacture of the residential robotic device 130 from which the traversed area data originates at (2). The device type detector 121 may detect the type and/or manufacture of the residential robotic device 130 based on the location of a traversed area map and/or an estimated area covered present in an image or screenshot of a user interface that forms the traversed area data, based on the value (e.g., color) of pixels in the traversed area map that indicate an area covered by the residential robotic device 130, based on whether the traversed area map is a two-dimensional or three-dimensional diagram of a floor, based on metadata included in the traversed area data that identifies the model or serial number of the residential robotic device 130, and/or the like. As an illustrative example, one type or manufacture of residential robotic device 130 may depict the estimated area covered in a top-right portion of a user interface, whereas another type or manufacture of residential robotic device 130 may depict the estimated area covered in a bottom-left portion of a user interface.

Once the type and/or manufacture of the residential robotic device 130 is detected, the device type detector 121 can transmit an indication of the detected device and/or manufacture type and the traversed area data to the traversed area image processor 122 at (3). The indication may include image processing or extraction instructions corresponding to the detected type and/or manufacture of residential robotic device 130, where the image processing or extraction instructions can be used by the traversed area image processor 122 to determine how to extract the traversed area map and/or the estimated area covered from the traversed area data (e.g., instructions that may guide the traversed area image processor 122 in identifying the proper location within the image or screenshot of the user interface at which the traversed area map and/or estimated area covered are located).

The traversed area image processor 122 can extract the traversed area map and the estimated area covered from the traversed area data based on the detected device type at (4). For example, the traversed area image processor 122 can use the image processing or extraction instructions along with OCR operations to extract, from the image or screenshot, text representing the estimated area covered. Similarly, the traversed area image processor 122 can use the image processing or extraction instructions to extract, from the image or screenshot, pixels that form the traversed area map.

The traversed area image processor 122 can then apply image processing operations to produce an estimated living area of a floor on which the residential robotic device 130 operated. For example, the traversed area image processor 122 can remove or reduce noise from the traversed area map at (5) to form a slightly dilated, traversed area map. The traversed area image processor 122 can then fill in holes in the slightly dilated, traversed area map at (6) to form a further dilated, traversed area map. The traversed area image processor 122 can further fill in missing corners and/or sides in the further dilated, traversed area map at (7) to form a filled-in, traversed area map. Once the holes, corners, and/or sides are filled in, the traversed area image processor 122 can resize the further dilated, traversed area map at (8) to form an eroded, traversed area map. The traversed area image processor 122 can generate a polygon using the eroded, traversed area map at (9), and estimate a living area of the floor on which the residential robotic device 130 operated using the generated polygon at (10). The traversed area image processor 122 then transmits the estimated living area of the floor to the machine learning-based living area estimator 123 at (11).

The machine learning-based living area estimator 123 may estimate the living area of the entire structure. For example, the machine learning-based living area estimator 123 may obtain property data for the structure for which traversed area data was provided from the property data store 150 at (12). The machine learning-based living area estimator 123 can then apply the property data and the estimated living area of the floor as an input to a trained machine learning model to estimate a living area of the structure at (13). In particular, the machine learning model may be trained by the machine learning-based living area estimator 123 using training data that includes sets of property data and living area estimates produced using the image processing techniques described above, where each set corresponds to a structure and is labeled with an indication of an actual living area of the structure. The estimated living area output by the machine learning-based living area estimator 123 may be the same as the living area of the floor produced by the traversed area image processor 122 if the structure is a single-story dwelling (which may be indicated by the property data of the structure).

Example Modification to Traversed Area Map

FIGS. 3A-3E illustrate example modifications to traversed area map 300. For example, different versions of the traversed area map 300 depicted in FIGS. 3A-3E may be generated by the traversed area image processor 122.

Figure 3A:
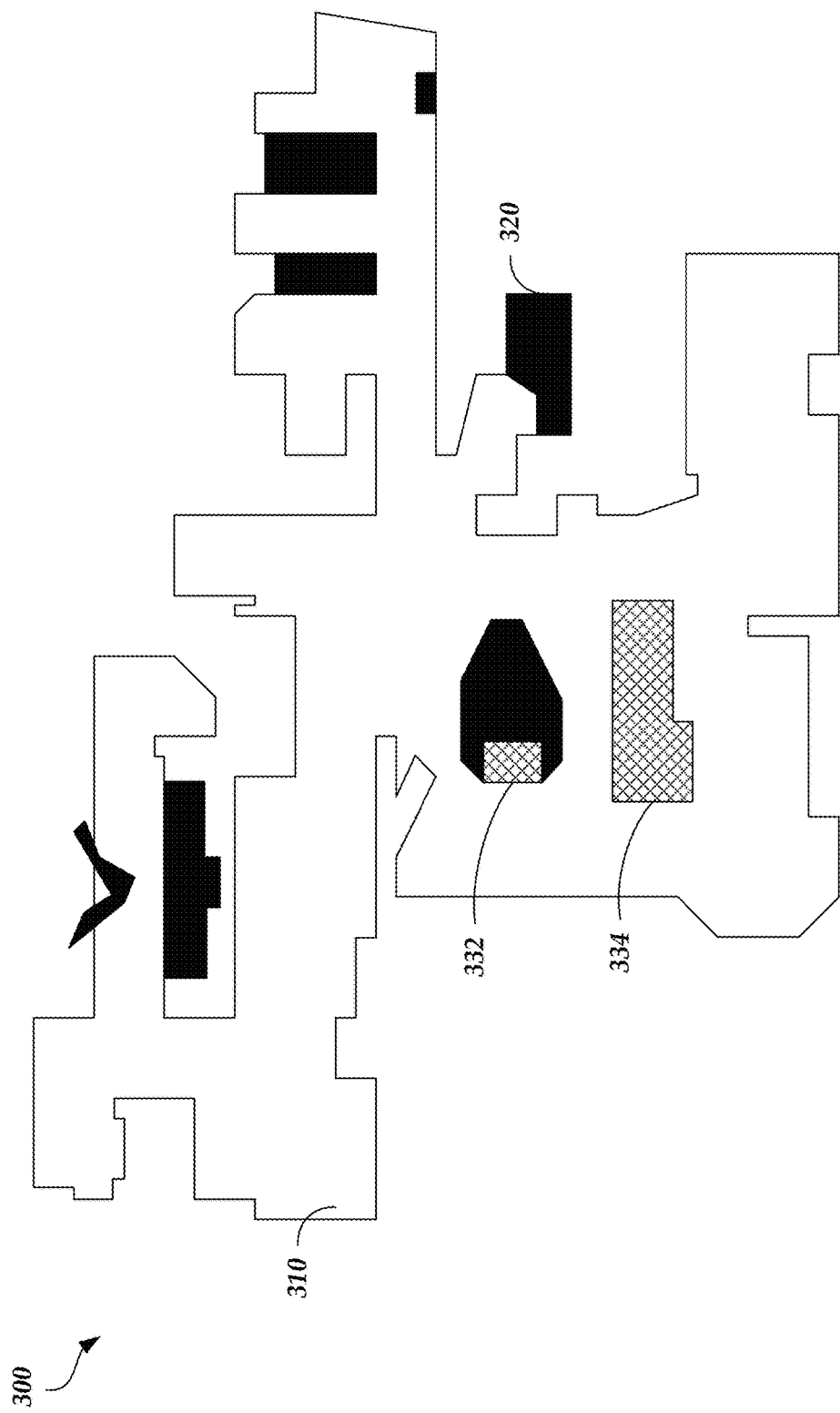

As illustrated in FIG. 3A, the traversed area map 300 includes an area 310 (e.g., the area in white) that represents an area covered by the residential robotic device 130 and an area 320 (e.g., the areas in black) that includes noise or other artifacts that appear in the traversed area map 300 due to interference or other issues with the navigational sensor(s) 132 of the residential robotic device 130. The traversed area map 300 further includes areas 332 and 334 (e.g., the areas that have cross-hatching) that represent areas not covered by the residential robotic device 130 (e.g., due to obstructions), but that otherwise should be considered the living area of the floor. The traversed area map 300 depicted in FIG. 3A may be the map originally produced by the residential robotic device 130, residential robotic device data storage server 140, and/or user device 102 using the raw navigational sensor 132 data or information.

Figure 3B:
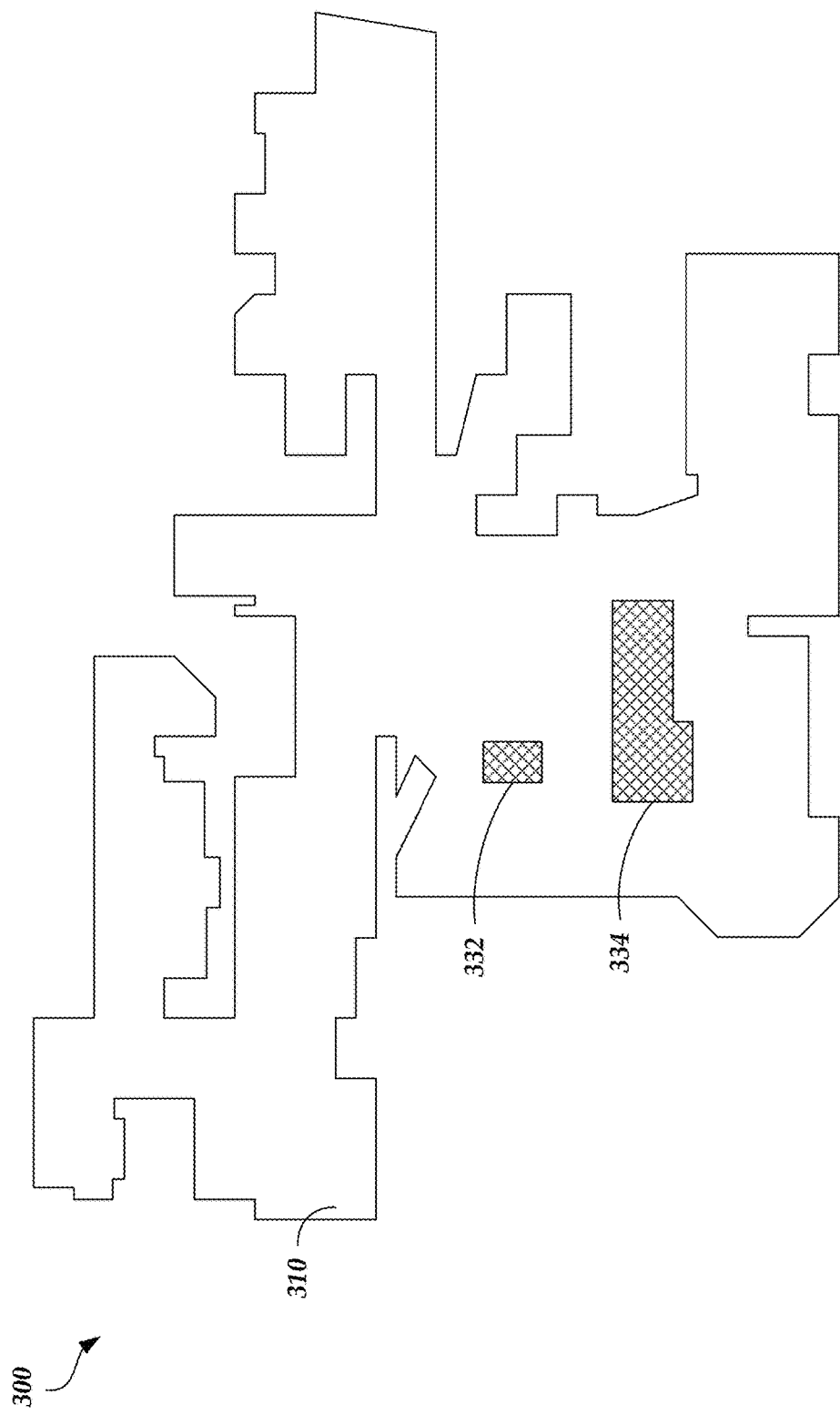
Figure 3C:
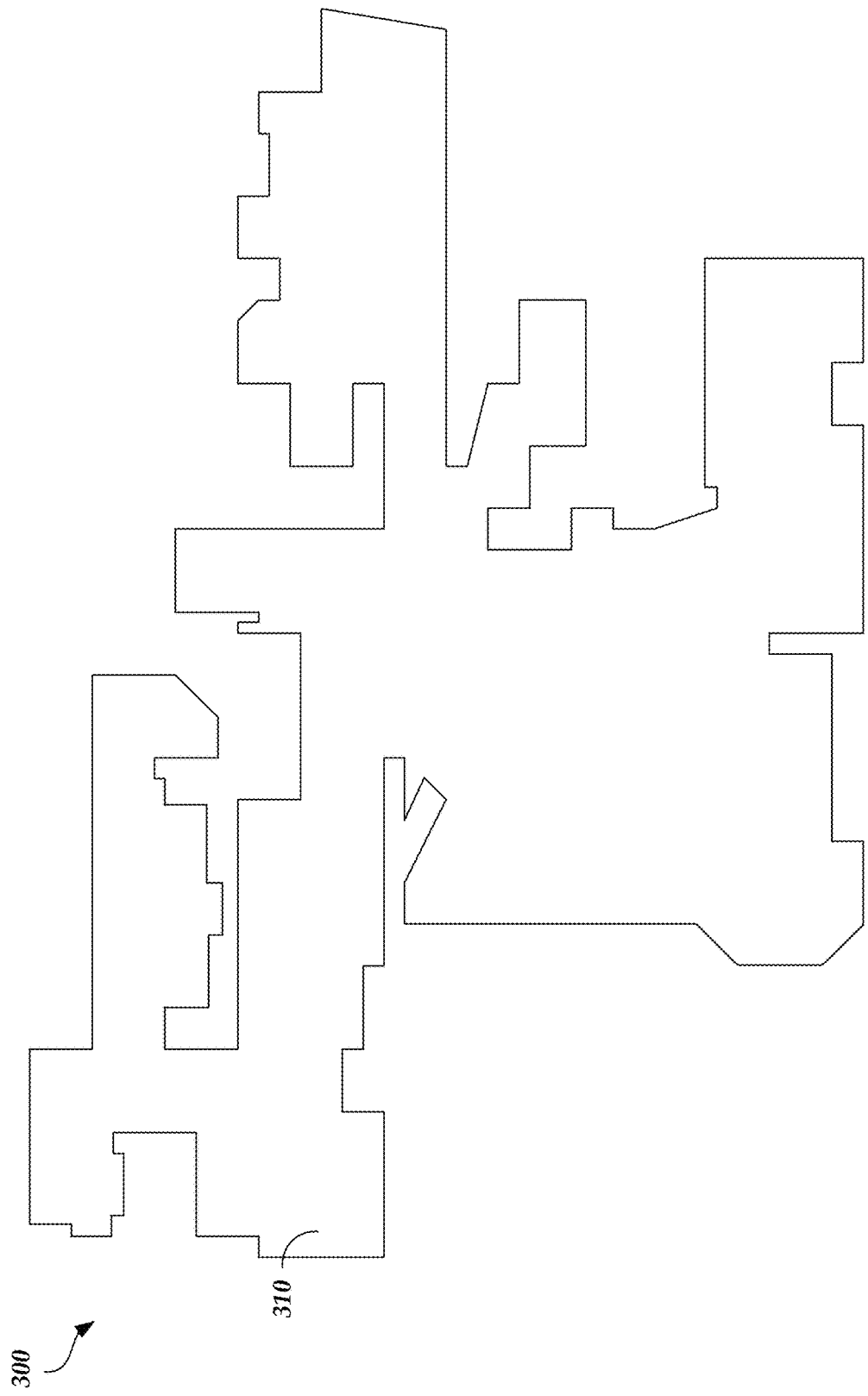

Initially, the traversed area image processor 122 may attempt to remove or reduce the noise in the original traversed area map 300 as described herein. The operation performed to remove or reduce the noise may result in a slightly dilated, traversed area map 300, as illustrated in FIG. 3B. The slightly dilated, traversed area map 300 depicted in FIG. 3B no longer includes the area 320, which is replaced by pixels having values that match the values of the pixels corresponding to the area 310. However, areas 332 and 334 remain. Thus, the traversed area image processor 122 can perform an operation to fill in the areas 332 and 334 to form a further dilated, traversed area map 300, as depicted in FIG. 3C.

Figure 3D:
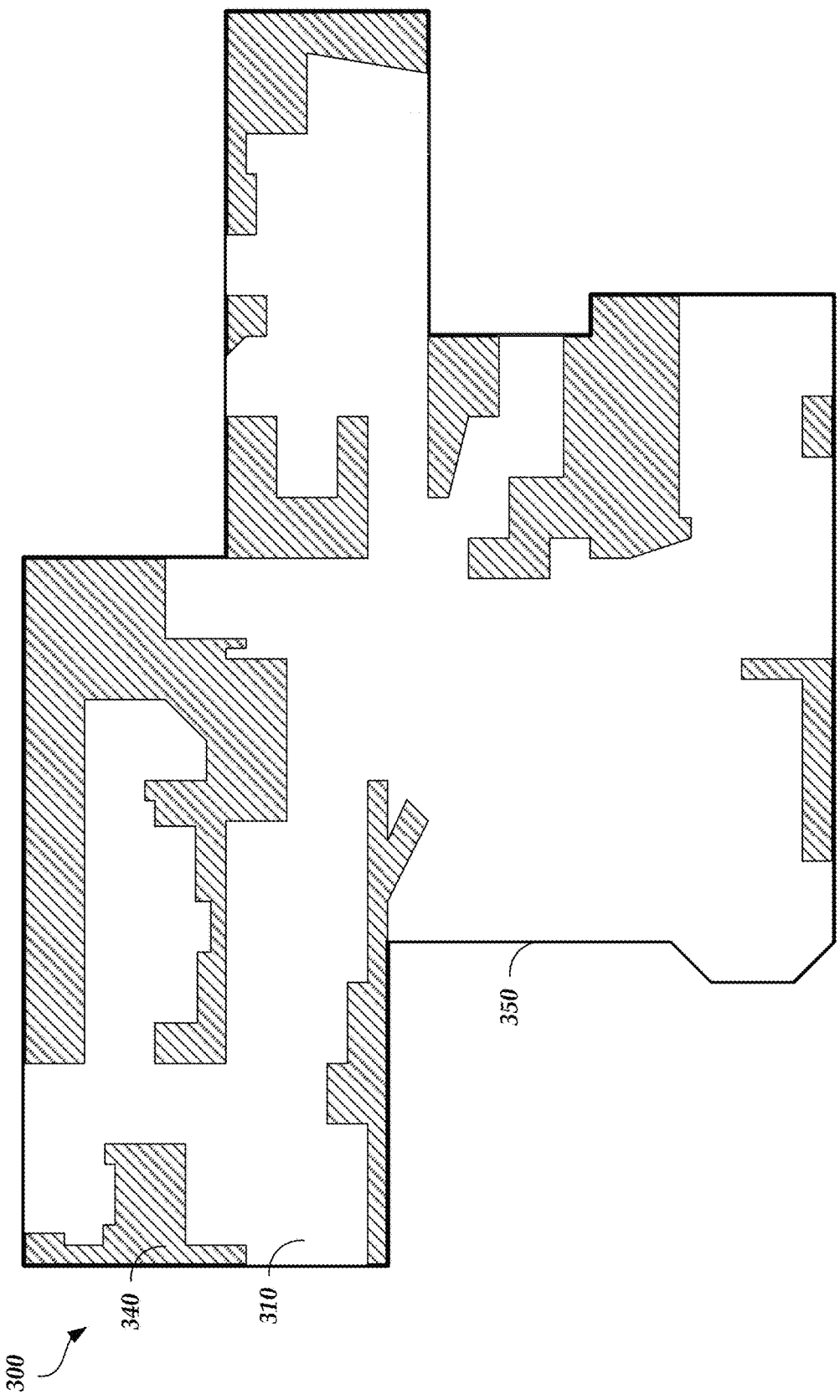

Not only may the further dilated, traversed area map 300 not include the areas 332 and 334—which are replaced by pixels having values that match the values of the pixels corresponding to the area 310—but the further dilated, traversed area map 300 may be a larger size than the slightly dilated, traversed area map 300 depicted in FIG. 3B given the dilation that is performed. While the further dilated, traversed area map 300 may appear to be a more accurate version of the living area of the floor, the residential robotic device 130 may have been unable to reach corners or sides of the floor. Thus, the traversed area image processor 122 can fill in corners and/or sides of the further dilated, traversed area map 300 to form a filled-in, traversed area map 300, as illustrated in FIG. 3D.

The filled-in, traversed area map 300 may include a boundary 350 that encloses the area 310 and area 340 (e.g., the areas with diagonal shading). The filled-in, traversed area map 300 includes areas 310 and 340 with different shading, but this is for illustrative purposes only to show the additional areas that now form the map 300. The areas 310 and 340 may otherwise have pixels with the same value (e.g., color).

Because the size of the filled-in, traversed area map 300 may be larger than the size of the original traversed area map 300 depicted in FIG. 3A, the traversed area image processor 122 may reduce the size of the filled-in, traversed area map 300 by, for example, performing an operation that is the reverse of the operation(s) performed to fill in the holes, corners, and/or sides (e.g., perform an erode operation that is the reverse of the dilation operation(s) previously performed). Reducing the size of the filled-in, traversed area map 300 may result in the eroded, traversed area map 300 illustrated in FIG. 3E. The traversed area image processor 122 may then use the eroded, traversed area map 300 to generate a polygon that can be used to estimate the living area of the floor on which the residential robotic device 130 operated.

Example Traversed Area Data Processing Routine

Figure 4:
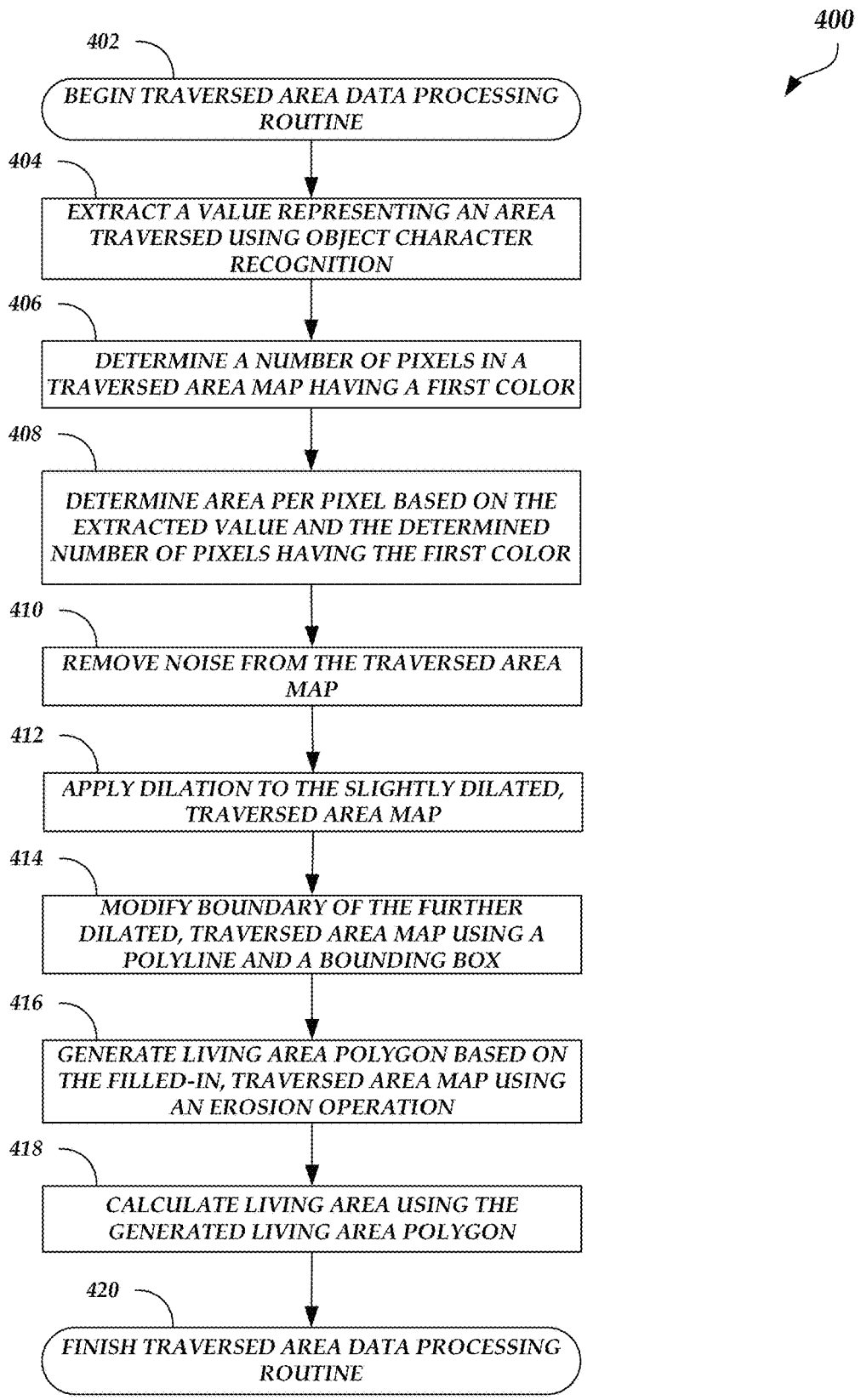
FIG. 4 is a flow diagram depicting an example, traversed area data processing routine illustratively implemented by a living area estimation system, according to one embodiment.

FIG. 4 is a flow diagram depicting an example, traversed area data processing routine 400 illustratively implemented by a living area estimation system, according to one embodiment. As an example, the living area estimation system 120 of FIG. 1 (e.g., the traversed area image processor 122) can be configured to execute the traversed area data processing routine 400. The traversed area data processing routine 400 begins at block 402.

At block 404, a value representing an area traversed is extracting using object character recognition. For example, the value representing the area traversed may be extracted from traversed area data received from the residential robotic device 130, the residential robotic device data storage server 140, and/or a user device 102.

Alternatively, the traversed area data map may be received directly or indirectly from the residential robotic device 130, such as via an API call made by the living area estimation system 120 to the residential robotic device 130 or the residential robotic device data storage server 140. In such a situation, the value representing the area traversed may not need to be extracted using object character recognition. Rather, the value may be present in the traversed area data in a field or other known location and can be accessed therein.

At block 406, a number of pixels in a traversed area map included in the traversed area data having a first color is determined. For example, the first color may represent the area covered by the residential robotic device 130 during an operating session.

At block 408, an area per pixel is determined based on the extracted value and the determined number of pixels having the first color. For example, the area per pixel may be the extracted value divided by the determined number of pixels having the first color.

At block 410, noise is removed or reduced from the traversed area map. For example, a slight dilation operation may be performed on the traversed area map to form a slightly dilated, traversed area map in which noise is removed or reduced as compared to the original traversed area map.

At block 412, dilation is applied to the slightly dilated, traversed area map to form a further dilated, traversed area map. For example, the dilation performed in block 412 may be more expansive and occur more often than the dilation performed in block 410. By applying the dilation, holes in the slightly dilated, traversed area map (e.g., areas within the boundary of the slightly dilated, traversed area map that do not share the same pixel value as the areas that are indicated as being covered by the residential robotic device 130) may be filled in such that the areas corresponding to the holes have the same pixel value as the areas that are indicated as being covered by the residential robotic device 130.

At block 414, a boundary of the further dilated, traversed area map is modified using a polyline and a bounding box to form a filled-in, traversed area map. For example, the boundary may be modified by filling in corners and/or sides of the further dilated, traversed area map using a convex hull polyline and one or more bounding boxes that surround defect(s) (e.g., concave portion(s)) in the convex hull polyline, forming a filled-in, traversed area map.

At block 416, a living area polygon is generated based on the filled-in, traversed area map using an erosion operation. For example, an erode operation performed on the filled-in, traversed area map may result in an eroded, traversed area map. The traversed area image processor 122 may use an open or closed polyline that partially or fully surrounds the eroded, traversed area map to generate a living area polygon (e.g., a shape that encompasses the space partially or fully enclosed by the polyline).

At block 418, a living area is calculated using the generated living area polygon. The living area that is calculated may be an estimate of the living area of a floor on which the residential robotic device 130 operated. The living area estimation system 120 may output this value as the estimated living area of the structure if the structure is a single-story dwelling. Otherwise, if the structure is a multi-story dwelling, the machine learning-based area estimator 123 may perform additional operations using the calculated living area of the floor to estimate the living area of the structure. After the living area is calculated, the traversed area data processing routine 400 proceeds to block 420 and ends.

Example Living Area Estimation Routine

Figure 5:
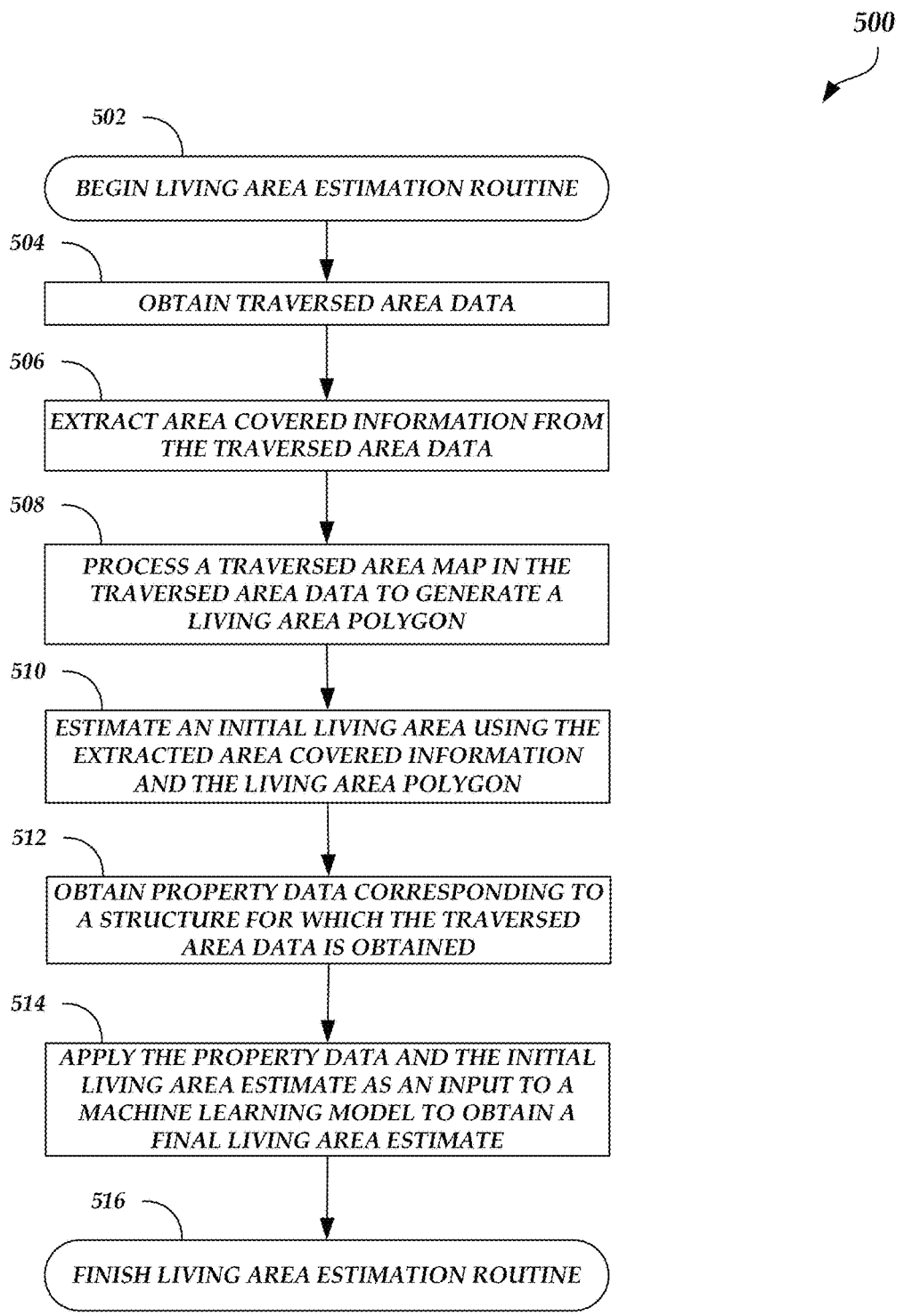
FIG. 5 is a flow diagram depicting an example, living area estimation routine illustratively implemented by a living area estimation system, according to one embodiment.

FIG. 5 is a flow diagram depicting an example, living area estimation routine 500 illustratively implemented by a living area estimation system, according to one embodiment. As an example, the living area estimation system 120 of FIG. 1 can be configured to execute the living area estimation routine 500. The living area estimation routine 500 begins at block 502.

At block 504, traversed area data is obtained. For example, the traversed area data may be obtained from a residential robotic device 130 or the residential robotic device data storage server 140 via an API call transmitted to the device 130 or server 140. As another example, the traversed area data may be obtained from a user device 102 in response to a user submitting a screenshot of a user interface depicting the traversed area map and/or estimated area covered or a user selecting a user interface option to transmit the traversed area map and/or the estimated area covered to the living area estimation system 120.

At block 506, area covered information (e.g., area covered by the residential robotic device 130, in square footage, square meter, etc.) is extracted from the traversed area data.

The area covered information may be extracted using OCR or other similar image processing techniques.

At block 508, a traversed area map in the traversed area data is processed to generate a living area polygon. For example, one or more dilation operations may be applied to the traversed area map, one or more polylines and/or bounding boxes may be applied to the traversed area map, and/or one or more erosion operations may be applied to the traversed area map to form a modified version of the traversed area map from which the living area polygon is generated. In particular, a polyline that partially or fully surrounds the modified version of the traversed area map may be used to generate the living area polygon. The traversed area data processing routine 400 of FIG. 4 describes in greater detail the operations performed to generate the living area polygon.

At block 510, an initial living area is estimated using the extracted area covered information and the living area polygon. For example, the extracted area covered information can be used to determine a resolution of the traversed area map. The number of pixels in the living area polygon can then be counted and multiplied by the resolution to determine the initial living area estimate. The initial living area estimate may be the estimate of the living area of a floor on which the residential robotic device 130 operated.

At block 512, property data is obtained corresponding to a structure for which the traversed area data is obtained. The property data may include, for example, the number of stories in the structure. If the structure has multiple stories, then the initial living area estimate may be a partial estimate of the living area of the structure. Otherwise, if the structure has one story, then the initial living area estimate may be the final estimate of the living area of the structure.

At block 514, the property data and the initial living area estimate are provided as an input to a machine learning model to obtain a final living area estimate. For example, the trained machine learning model may be trained to estimate the living area of the entire structure given that at least one floor of the structure has a living area equal to the initial living area estimate. The machine learning model may have been trained using property data that includes, for example, the number of stories of a structure and an initial living area estimate of one of the stories of the structure, where the data is labeled to indicate the actual living area of the structure. After the final living area is estimated, the living area estimation routine 500 proceeds to block 516 and ends.

ADDITIONAL EMBODIMENTS

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. A user device 102 may execute an application (e.g., a browser, a stand-alone application, etc.) that allows a user to view traversed area data generated in response to a residential robotic device 130 navigating an indoor space, request a living area of a structure, and/or provide to the living area estimation system 120 traversed area data that can be used to estimate the living area of a structure.

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

TERMINOLOGY

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for estimating a living area of a structure, the system comprising:
    memory that stores computer-executable instructions; and
    a processor in communication with the memory, wherein the computer-executable instructions, when executed by the processor, cause the processor to:
        obtain traversed area data generated in response to a residential robotic device traversing an indoor space of a structure, wherein the traversed area data comprises area covered information and a traversed area map that indicates an area in the indoor space of the structure traversed by the residential robotic device during an operating session;
        extract the area covered information from the traversed area data;
        generate a living area polygon represented by a shape that encompasses a portion of the traversed area map that is at least partially enclosed by a polyline based on a number of pixels in the traversed area map that have a first characteristic;
        estimate an initial living area of the structure using the extracted area covered information and the living area polygon;
        obtain property data corresponding to the structure in which the residential robotic device traversed; and
        apply the property data and the estimated initial living area as an input to a machine learning model to obtain a final living area estimate of the structure.

2. The system of claim 1, wherein the computer-executable instructions, when executed, further cause the processor to:
    extract a value representing the area traversed by the residential robotic device from the traversed area data using object character recognition;
    determine the number of pixels in the traversed area map that have a first color; and
    determine a resolution of the traversed area map based on the extracted value and the number of pixels in the traversed area map that have the first color.

3. The system of claim 2, wherein the computer-executable instructions, when executed, further cause the processor to:
remove noise from the traversed area map to form a first modified traversed area map;
fill in holes in the first modified traversed area map to form a second modified traversed area map;
fill in at least one of a corner or a side of the second modified traversed area map to form a third modified traversed area map;
reduce a size of the third modified traversed area map to form a fourth modified traversed area map; and
generate the living area polygon using the polyline, wherein the polyline at least partially surrounds the fourth modified traversed area map.

4. The system of claim 3, wherein the computer-executable instructions, when executed, further cause the processor to estimate the initial living area using the living area polygon and the determined resolution.

5. The system of claim 1, wherein the computer-execution instructions, when executed, further cause the processor to estimate one or more ceiling heights of the indoor space of the structure using distance data obtained from the residential robotic device.

6. The system of claim 5, wherein the computer-execution instructions, when executed, further cause the processor to generate a three-dimensional model of the indoor space of the structure using the estimated one or more ceiling heights and the living area polygon.

7. The system of claim 1, wherein the computer-execution instructions, when executed, further cause the processor to estimate one or more surface elevations of the indoor space of the structure using altimeter data obtained from the residential robotic device.

8. The system of claim 1, wherein the computer-execution instructions, when executed, further cause the processor to estimate an outdoor area of a parcel on which the structure is located using outdoor traversed area data obtained from a second residential robotic device.

9. The system of claim 8, wherein the computer-execution instructions, when executed, further cause the processor to estimate a total area of a parcel on which the structure is located using the estimated outdoor area of the parcel and the final living area estimate.

10. The system of claim 8, wherein second residential robotic device is a different type of device than the residential robotic device.

11. The system of claim 1, wherein the residential robotic device comprises one of a self-powered robotic vacuum, a remote-controlled vehicle, an unmanned aerial vehicle, or a mobile device.

12. The system of claim 1, wherein the residential robotic device comprises an indoor device that moves without human assistance and that includes one or more navigational sensors.

13. A computer-implemented method for estimating a living area of a structure, the computer-implemented method comprising:
obtaining traversed area data generated in response to a residential robotic device traversing an indoor space of a structure, wherein the traversed area data comprises area covered information and a traversed area map that indicates an area in the indoor space of the structure traversed by the residential robotic device during an operating session;
extracting the area covered information from the traversed area data;
generating a living area polygon represented by a shape that encompasses a portion of the traversed area map that is at least partially enclosed by a polyline based on a number of pixels in the traversed area map that have a first characteristic;
estimating an initial living area of the structure using the extracted area covered information and the living area polygon;
obtaining property data corresponding to the structure in which the residential robotic device traversed; and
applying the property data and the estimated initial living area as an input to a machine learning model to obtain a final living area estimate of the structure.

14. The computer-implemented method of claim 13, wherein processing a traversed area map in the traversed area data using image processing techniques to generate a living area polygon further comprises:
extracting a value representing the area traversed by the residential robotic device from the traversed area data using object character recognition;
determining the number of pixels in the traversed area map that have a first color; and
determining a resolution of the traversed area map based on the extracted value and the number of pixels in the traversed area map that have the first color.

15. The computer-implemented method of claim 14, wherein processing a traversed area map in the traversed area data using image processing techniques to generate a living area polygon further comprises:
removing noise from the traversed area map to form a first modified traversed area map;
filling in holes in the first modified traversed area map to form a second modified traversed area map;
filling in at least one of a corner or a side of the second modified traversed area map to form a third modified traversed area map;
reducing a size of the third modified traversed area map to form a fourth modified traversed area map; and
generating the living area polygon using the polyline, wherein the polyline at least partially surrounds the fourth modified traversed area map.

16. The computer-implemented method of claim 15, wherein estimating an initial living area using the extracted area covered information and the living area polygon further comprises estimating the initial living area using the living area polygon and the determined resolution.

17. A non-transitory, computer-readable medium comprising computer-executable instructions for estimating a living area of a structure, wherein the computer-executable instructions, when executed by a computer system, cause the computer system to:
obtain traversed area data generated in response to a residential robotic device traversing an indoor space of a structure, wherein the traversed area data comprises area covered information and a traversed area map that indicates an area in the indoor space of the structure traversed by the residential robotic device during an operating session;
extract the area covered information from the traversed area data;
generate a living area polygon represented by a shape that encompasses a portion of the traversed area map that is at least partially enclosed by a polyline based on a number of pixels in the traversed area map that have a first characteristic;

estimate an initial living area of the structure using the extracted area covered information and the living area polygon;

obtain property data corresponding to the structure in which the residential robotic device traversed; and apply the property data and the estimated initial living area as an input to a machine learning model to obtain a final living area estimate of the structure.

18. The non-transitory, computer-readable medium of claim 17, wherein the computer-executable instructions, when executed, further cause the computer system to:

extract a value representing the area traversed by the residential robotic device from the traversed area data using object character recognition;

determine the number of pixels in the traversed area map that have a first color; and determine a resolution of the traversed area map based on the extracted value and the number of pixels in the traversed area map that have the first color.

19. The non-transitory, computer-readable medium of claim 18, wherein the computer-executable instructions, when executed, further cause the computer system to:

remove noise from the traversed area map to form a first modified traversed area map;

fill in holes in the first modified traversed area map to form a second modified traversed area map;

fill in at least one of a corner or a side of the second modified traversed area map to form a third modified traversed area map;

reduce a size of the third modified traversed area map to form a fourth modified traversed area map; and generate the living area polygon using the polyline, wherein the polyline at least partially surrounds the fourth modified traversed area map.

20. The non-transitory, computer-readable medium of claim 19, wherein the computer-executable instructions, when executed, further cause the computer system to estimate the initial living area using the living area polygon and the determined resolution.

\* \* \* \* \*